United States Patent
Kobayashi et al.

(10) Patent No.: US 10,038,179 B2
(45) Date of Patent: Jul. 31, 2018

(54) METHOD FOR PRODUCING ELECTRODE AND METHOD FOR PRODUCING BATTERY

(71) Applicant: KABUSHIKI KAISHA TOSHIBA, Tokyo (JP)

(72) Inventors: Takashi Kobayashi, Kashiwazaki (JP); Hideaki Morishima, Kashiwazaki (JP); Masaomi Nakahata, Kamakura (JP); Kazuhiko Mori, Tokyo (JP); Ikuo Uematsu, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 472 days.

(21) Appl. No.: 13/969,047

(22) Filed: Aug. 16, 2013

(65) Prior Publication Data

US 2013/0326865 A1      Dec. 12, 2013

Related U.S. Application Data

(63) Continuation of application No. PCT/JP2012/053844, filed on Feb. 17, 2012.

(30) Foreign Application Priority Data

Feb. 18, 2011   (JP) ................... 2011-033721
Feb. 18, 2011   (JP) ................... 2011-033852

(51) Int. Cl.
*H01M 4/00* (2006.01)
*H01M 4/04* (2006.01)
(Continued)

(52) U.S. Cl.
CPC ........... *H01M 4/0435* (2013.01); *H01M 4/04* (2013.01); *H01M 4/0433* (2013.01);
(Continued)

(58) Field of Classification Search
CPC .... H01M 4/0435; H01M 4/8896; H01M 4/88; H01M 4/04; H01M 4/0433; H01M 4/139;
(Continued)

(56) References Cited

U.S. PATENT DOCUMENTS

| 6,656,232 B1 | 12/2003 | Usui et al. |
| 2009/0100669 A1 | 4/2009 | Ikeda et al. |
| 2013/0074711 A1* | 3/2013 | Uematsu ............. H01M 4/0435 100/35 |

FOREIGN PATENT DOCUMENTS

| CN | 1159785 C | 7/2004 |
| EP | 1 121 722 B1 | 8/2004 |

(Continued)

OTHER PUBLICATIONS

English Translation of JP 2005-093236.*

(Continued)

*Primary Examiner* — Nicholas P D'Aniello
(74) *Attorney, Agent, or Firm* — Oblon, McClelland, Maier & Neustadt, L.L.P.

(57) ABSTRACT

According to one embodiment, a method for producing an electrode, includes applying tensile force. The electrode includes a strip current collector, a current collector exposed portion, and an active material-containing layer. In the applying tensile force, arranging a strip electrode plate on a roller including a step portion and a recessed portion such that the current collector exposed portion is positioned on the step portion and the active material-containing layer is positioned on the recessed portion, and then applying tensile force to the strip electrode plate in a longitudinal direction of the strip electrode plate.

10 Claims, 14 Drawing Sheets

(51) Int. Cl.
*H01M 4/139* (2010.01)
*H01M 4/66* (2006.01)
*H01M 10/04* (2006.01)

(52) U.S. Cl.
CPC ........... *H01M 4/139* (2013.01); *H01M 4/661* (2013.01); *H01M 4/0404* (2013.01); *H01M 10/04* (2013.01); *H01M 10/0431* (2013.01); *Y10T 29/49108* (2015.01)

(58) Field of Classification Search
CPC ............ H01M 10/0431; H01M 4/0404; B21B 27/005; B21B 27/00; B21B 27/032; B21B 27/021; B21B 27/022; B30B 9/00
USPC .............................................. 29/623.1–623.5
See application file for complete search history.

(56) References Cited

FOREIGN PATENT DOCUMENTS

| | | | | |
|---|---|---|---|---|
| JP | 2000-251942 | | 9/2000 | |
| JP | 2001-297753 | * | 10/2001 | ............. H01M 4/04 |
| JP | 2003-100286 | * | 4/2003 | ............. H01M 4/04 |
| JP | 2005-093236 | * | 4/2005 | ............. H01M 4/04 |
| JP | 2005-93236 | | 4/2005 | |
| JP | 2009-104850 | | 5/2009 | |
| JP | 2012-174434 | | 9/2012 | |

OTHER PUBLICATIONS

English Translation of JP2003-100286.*
English Translation of JP2001-297753.*
English Translation of JP2005-093236.*
Extended European Search Report dated Oct. 2, 2014, in European Patent Application No. 12746642.3.
Combined Chinese Office Action and Search Report dated Dec. 31, 2014 in Patent Application No. 201280004055.9 (with English Translation).
International Search Report dated Apr. 24, 2012 in PCT/JP2012/053844 filed on Feb. 17, 2012.
U.S. Appl. No. 13/974,436, filed Aug. 23, 2013, Morishima, et al.
U.S. Appl. No. 13/974,601, filed Aug. 23, 2013, Morishima, et al.

* cited by examiner

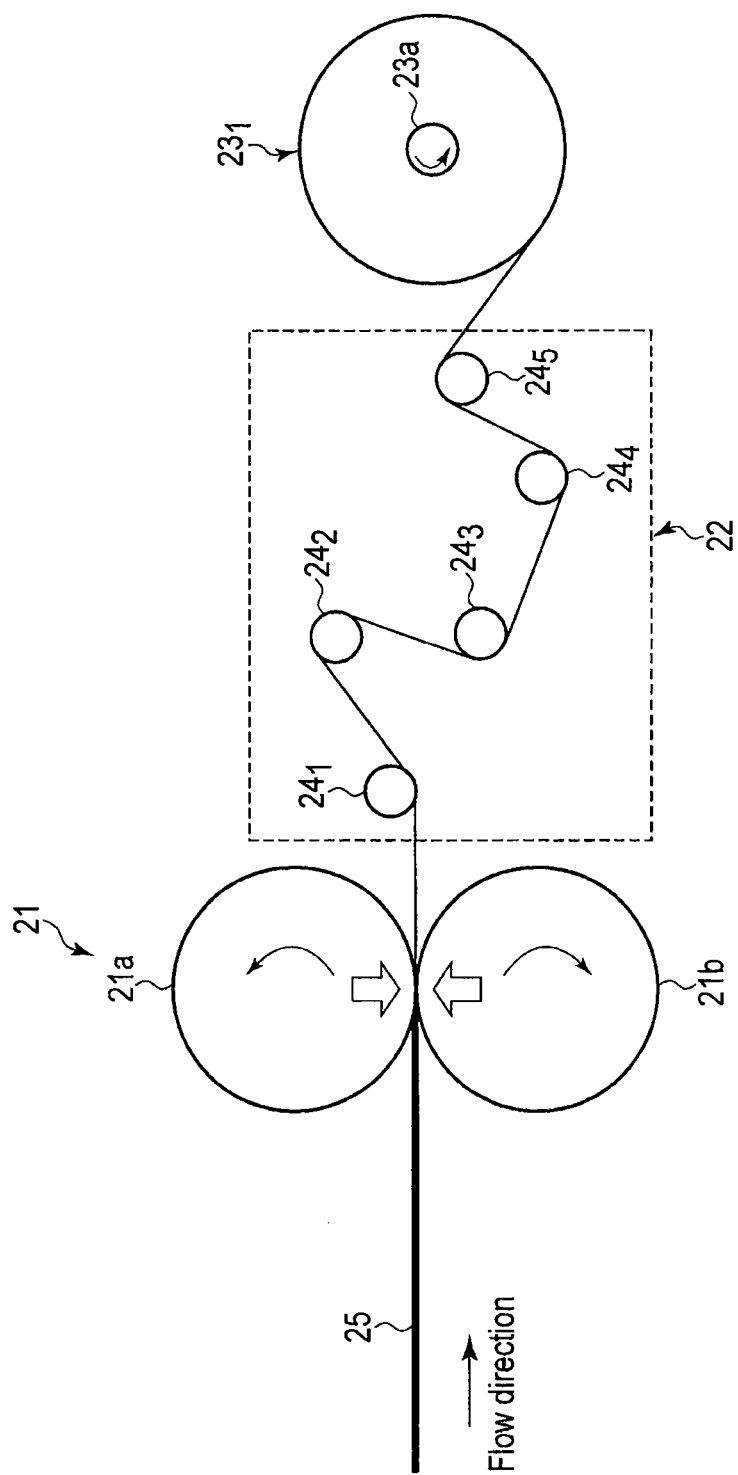
F I G. 8

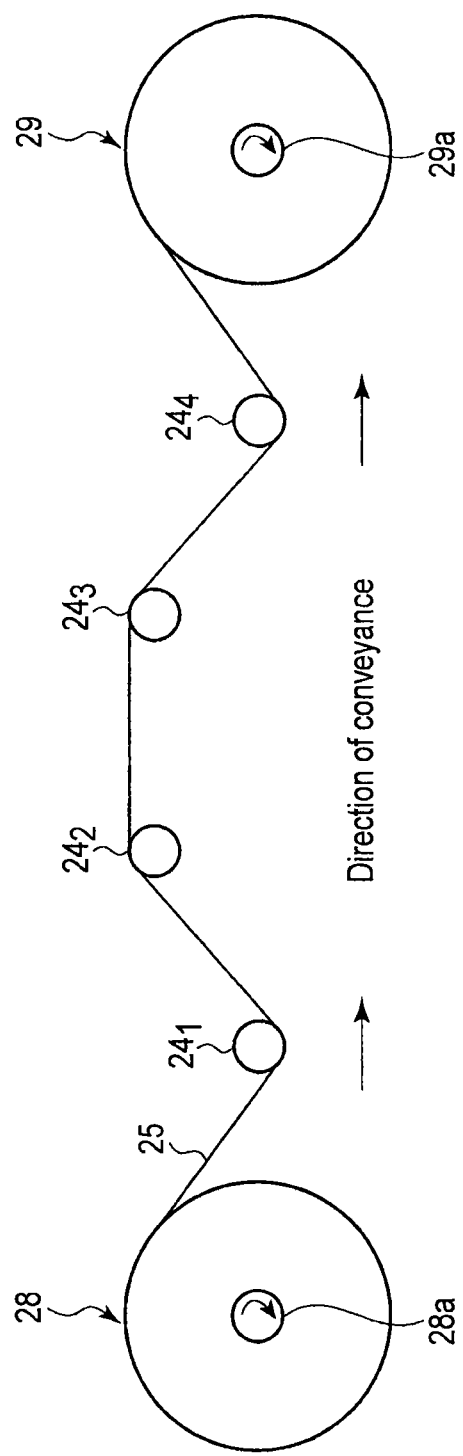
F I G. 12

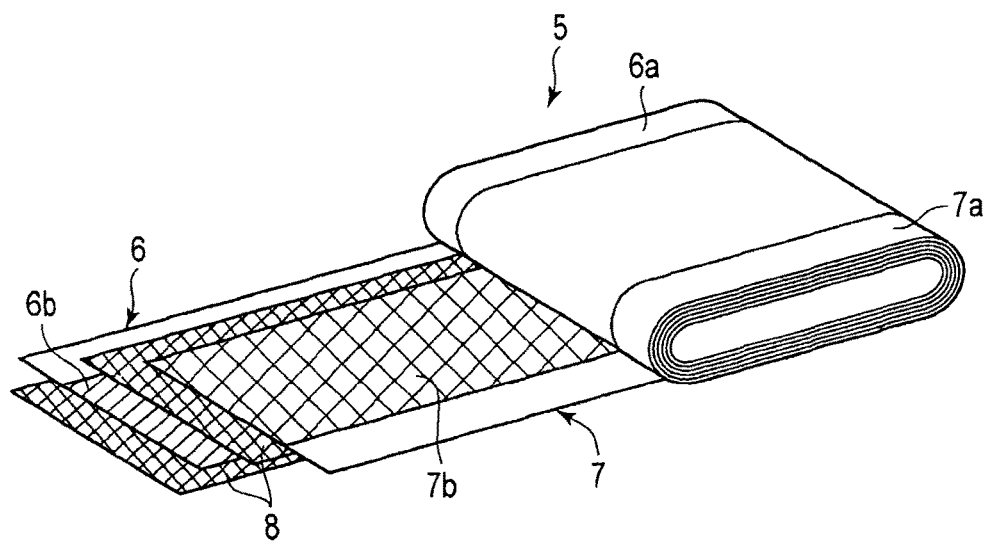
F I G. 15

METHOD FOR PRODUCING ELECTRODE AND METHOD FOR PRODUCING BATTERY

CROSS-REFERENCE TO RELATED APPLICATIONS

This is a Continuation Application of PCT Application No. PCT/JP2012/053844, filed Feb. 17, 2012, and is based upon and claims the benefit of priority from Japanese Patent Applications No. 2011-033721, filed Feb. 18, 2011; and No. 2011-033852, filed Feb. 18, 2011, the entire contents of all of which are incorporated herein by reference.

FIELD

An embodiment relates to a method for producing an electrode and a method for producing a battery.

BACKGROUND

Batteries have been recently used for applications in the power sources of hybrid electric vehicles besides applications in conventional miniaturized electronic devices. This entails a desire for batteries having, for example, a high capacity, long-cycle life, and fast chargeability. Because the highest amount of active material is filled in a restricted space in a battery, the electrode is resultantly compressed in a higher density.

In the production of an electrode, an active material-containing slurry is applied to a current collector made of, for example, a metal foil, dried, and then, the coated portion is compressed by a roll press machine or the like. Although the current collector lying under the compressed coated portion is also stretched by plastic deformation, the uncoated portion which is not coated with the active material-containing slurry is not so much stretched as the coated portion because the pressure of the press machine is not applied to the current collector at the uncoated portion where the active material-containing slurry is not applied. As a result, a difference in the elongation of the current corrector between the coated and uncoated portions causes residual stress to act on the boundary between the coated portion and the uncoated portion, giving rise to the strain and warpage of the electrode.

When such an electrode is laminated on a separator and the laminate is wound, the distortion and warpage give rise to weaving and also cause wrinkles and cracks of the electrode and hence electrode breakage when compensating the weaving. Also, the distortion and warpage cause deteriorated quality and reduced yield and also cause a hindrance to high-speed operation of the production line. The reasons of the distortion and warpage of the electrode are a difference in the elongation of the current collector between the slurry-coated portion and the slurry-uncoated portion after compression. Proposed examples of a measures to solve the problem include a method in which a groove is formed on the press roll to compress the uncoated portion and the coated portion at the same time to stretch the uncoated current collector, and a method in which the current collector is further plastically deformed by tensile stress to stretch the current collector.

However, it is guessed that in the method forming a groove on a press roll, the surface of the roll which will be abraded by pressing the current collector needs to repolish at relatively high frequency and therefore, the use of the groove shape of the press roll is not effective technologically and efficiently. Moreover, when the uncoated current collector comes out of the groove due to, for example, meandering of the electrode, there is the problem concerning uneven compressive density and breakage of the electrode.

Examples of the method of plastically deforming the current collector by tensile stress to stretch the current collector include an application of the tension annealing treatment which is usually used in, for example, rolling and processing of iron steel materials. Tensile stress is applied to a material to be processed under heating, thereby producing such an effect as to reduce the stress required for elastic deformation. When, for example, an aluminum foil is used for the current collector, the standard of the stress required for plastic deformation is 100 N/mm² or more though depending on the thickness of the current collector and aluminum purity. The stress required for plastic deformation can be remarkably decreased by heating the current collector. However, in the case where the active material-containing layer of the electrode contains a material or component which is likely to be denatured at high temperatures, thereby deteriorating the performance of the battery, it is inevitable to limit heating temperature. This results in that the tensile stress cannot be significantly reduced in the heating temperature range to be applied, so that a stress several times the tensile stress originally required for winding up the electrode is required, arousing a fear as to breakage of the electrode and deterioration in winding accuracy.

BRIEF DESCRIPTION OF THE DRAWINGS

FIG. 8 is a typical view showing a step in a method according to a third embodiment;

FIG. 12 is a typical view showing a step in a method according to the third embodiment;

FIG. 15 is a partially exploded perspective view of an electrode group used in a battery shown in FIG. 14.

DETAILED DESCRIPTION

According to one embodiment, a method for producing an electrode, includes compression-molding and applying tensile force. In the compression-molding, compression-molding an active material-containing layer of a strip electrode plate. The strip electrode plate includes a strip current collector, a current collector exposed portion which is formed on at least one long side of the strip current collector and in which no active material-containing layer exists on each surface thereof, and an active material-containing layer formed on at least a part of the strip current collector excluding the current collector exposed portion. In the applying tensile force, arranging the strip electrode plate on a roller including a step portion projected from a circumferential surface and a recessed portion adjacent to the step portion such that the current collector exposed portion is positioned on the step portion and the active material-containing layer is positioned on the recessed portion, and then applying tensile force to the strip electrode plate in a longitudinal direction of the strip electrode plate.

According to the embodiment, a method for producing an electrode, includes applying tensile force. The electrode includes a strip current collector, a current collector exposed portion which is formed on at least one long side of the strip current collector and in which no active material-containing layer exists on each surface thereof, and an active material-containing layer formed on at least a part of the strip current collector excluding the current collector exposed portion. In the applying tensile force, arranging a strip electrode plate on a roller including a step portion projected from a circumferential surface and a recessed portion adjacent to the step portion such that the current collector exposed portion is positioned on the step portion and the active material-containing layer is positioned on the recessed portion, and then applying tensile force to the strip electrode plate in a longitudinal direction of the strip electrode plate.

An embodiment will be explained with reference to the drawings.

First Embodiment

Figure 1:
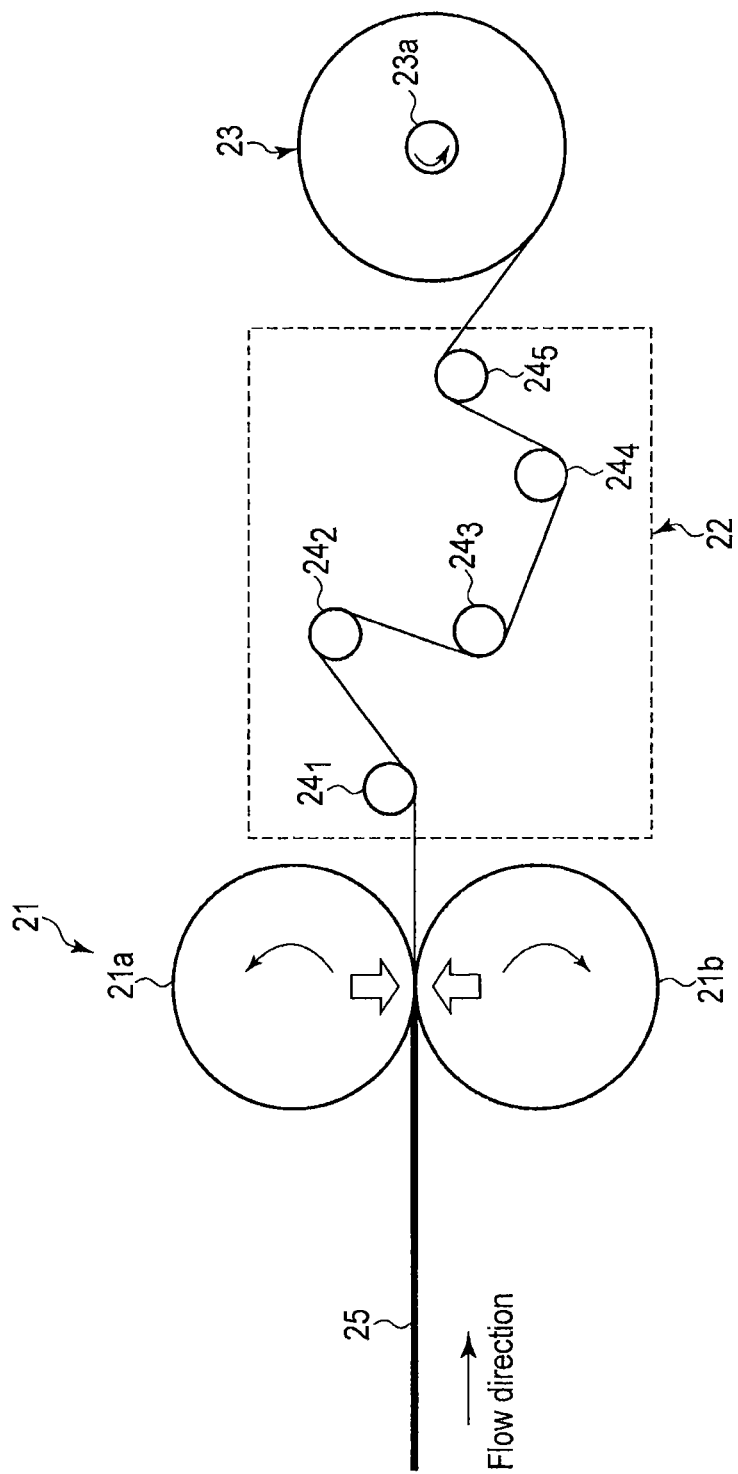
FIG. 1 is a typical view showing a step in a method according to a first embodiment.
Figure 2:
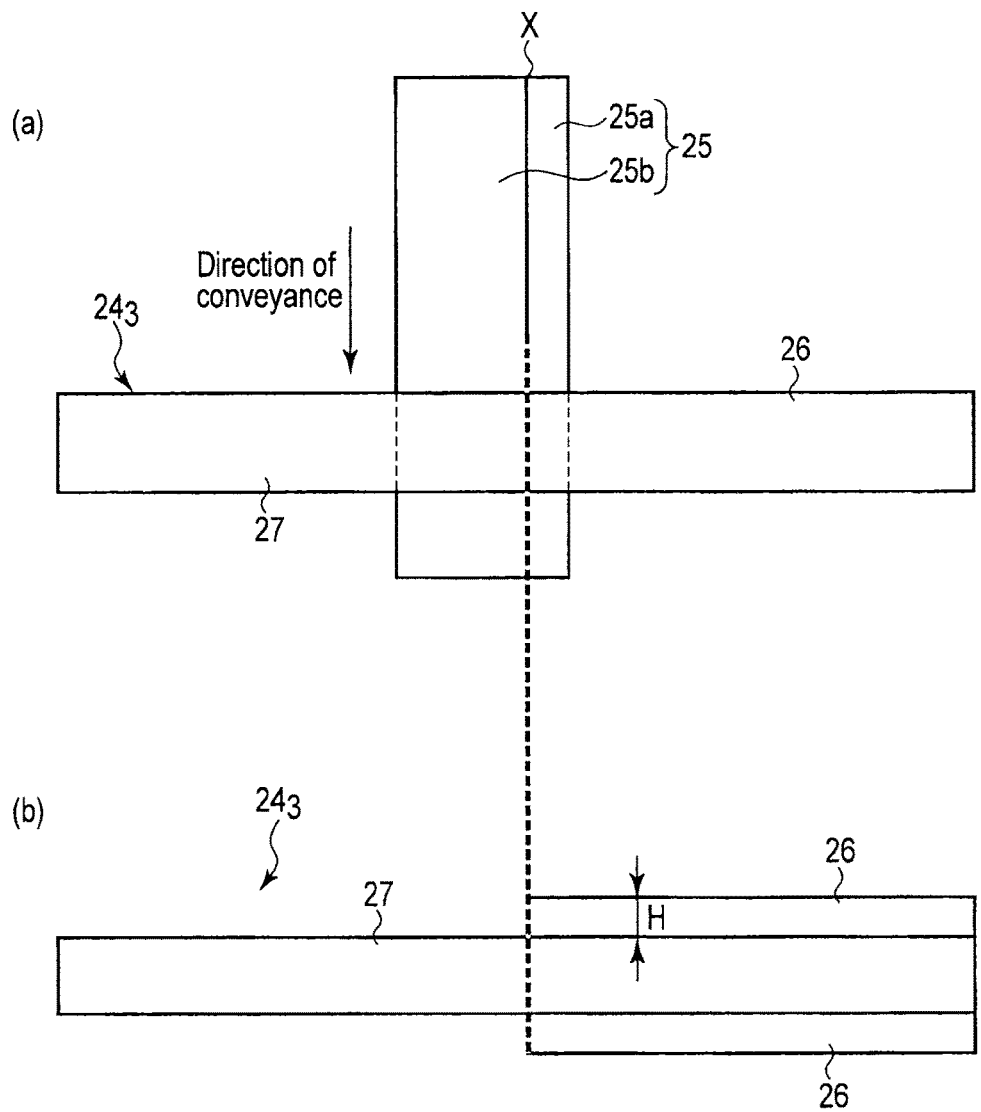
FIG. 2 is a typical view showing the positional relation between a guide roller and a strip electrode plate in FIG. 1.
Figure 3:
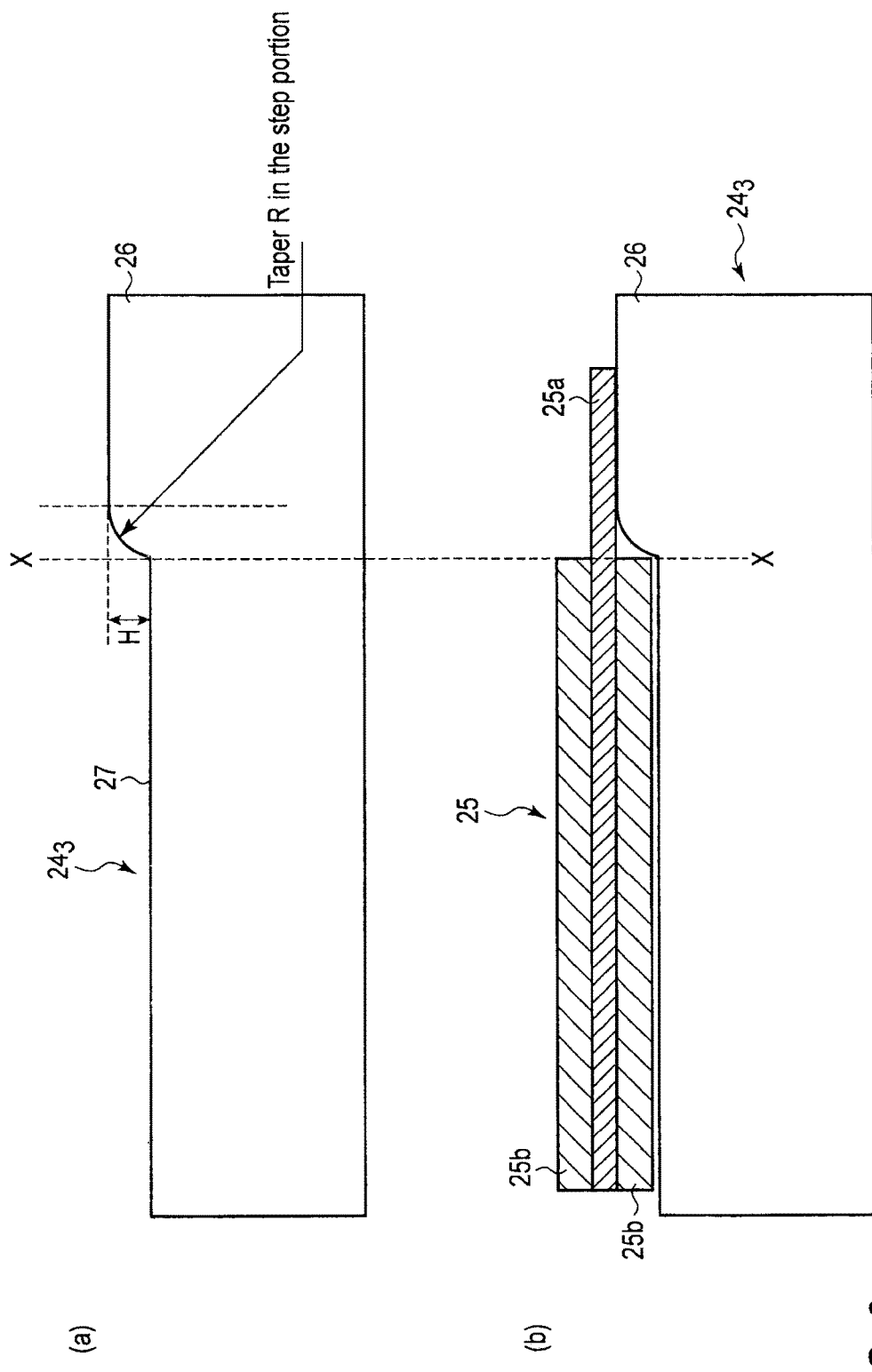
FIG. 3 is a sectional view showing the positional relation between a strip electrode plate and a guide roller which is used in the first embodiment.
Figure 4:
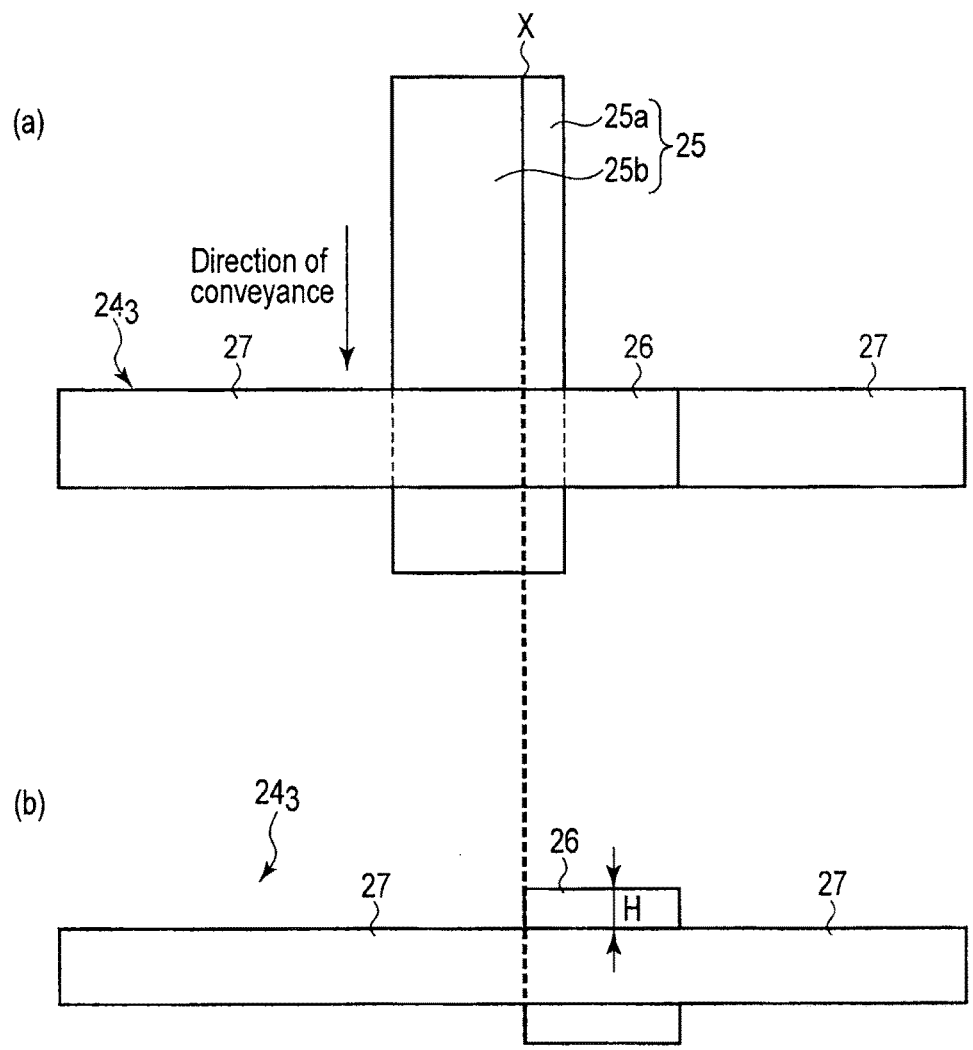
FIG. 4 is a sectional view showing the positional relation between a strip electrode plate and a guide roller which is used in the first embodiment.

FIG. 1 is a typical view showing a press machine, a guide roller, and a winder to be used in the production of an electrode. FIG. 2 is a typical view showing the positional relation between the guide roller and a strip electrode plate in a curvature correcting step. (a) of FIG. 2 is a plan view of the strip electrode plate running on the guide roller as viewed from the guide roller side and (b) of FIG. 2 is a sectional view obtained by cutting the guide roller in parallel to a rotating shaft. (a) of FIG. 3 is a sectional view obtained when cutting the guide roller in parallel to a rotating shaft, and the guide roller has a taper on the corner of a step portion. (b) of FIG. 3 is a sectional view showing the situation where the strip electrode plate is disposed on the guide roller shown in (a) of FIG. 3. (a) of FIG. 4 is a plane view of the strip electrode plate running on the guide roller as viewed from the guide roller side and (b) of FIG. 4 is a sectional view obtained when cutting the guide roller in parallel to the rotating shaft.

As shown in FIG. 1, a press machine 21, a guide roller 22, and a winder 23 are arranged in order from the front stage toward the last stage in the production process. The press machine 21 includes a pair of press rolls 21a and 21b. The press rolls 21a and 21b are rotated in the direction of the arrow shown in FIG. 1 by a driving section (not shown) to thereby compression-mold a strip electrode plate 25 inserted between the press rolls 21a and 21. The winder 23 is configured to wind up the strip electrode plate 25 into a hoop-shape by making a driving section (not shown) rotate a rotating shaft 23a in the direction of the arrow shown in FIG. 1. The guide roller 22 serves to transport the strip electrode plate 25 from the press machine 21 to the winder 23 and includes a plurality of metal guide rollers $24_1$ to $24_5$ (slave rollers). Tensile force (winding tension) in a longitudinal direction is applied to the strip electrode plate 25 conveyed from the press rolls 21a and 21b to the winder 23. The guide rollers $24_1$ to $24_5$ are arranged alternately on the upper and lower surfaces of the strip electrode plate 25 such that the tensile force applied to the strip electrode plate 25 falls within a desired range adequate to winding. The guide roller $24_3$ doubles as a curvature compensator. The guide roller $24_3$ includes a step portion 26 projected from the circumferential surface at one end in the direction of the rotating shaft. In the guide roller $24_3$, the remaining part adjacent to the step portion 26 constitutes a recessed portion 27.

A method for producing an electrode by using an apparatus shown in FIG. 1 will be explained. First, the strip electrode plate 25 is produced. The strip electrode plate 25 includes, as shown in (a) of FIG. 2 and (b) of FIG. 3, a strip current collector, a current collector exposed portion 25a which is formed on one of the long sides of the strip current collector and provided with no active material-containing layer on each surface thereof, and an active material-containing layer 25b formed on each surface of the strip current collector except for the current collector exposed portion 25a. The active material-containing layer 25b is formed continuously in the longitudinal direction of the strip current collector. The width in the direction of the short side is wider in the active material-containing layer 25b than in the current collector exposed portion 25a. The strip electrode plate 25 is obtained by applying an active material-containing slurry to both surfaces of the strip current collector except for one of the long sides, followed by drying. Or, the strip electrode plate 25 is obtained by applying an active material-containing slurry to a part of each surface of the current collector, by drying the slurry, and then by cutting such that the uncoated part which is to be the current collector exposed portion is positioned on the long side.

The active material-containing slurry is prepared, for example, by adding a conductive agent and a binder according to the need to an active material and by kneading these ingredients in the presence of a solvent. As the active material, any of materials for positive electrode and negative electrode may be used.

No particular limitation is imposed on the positive electrode active material and examples of the positive electrode active material may include various oxides such as lithium-containing cobalt oxides (for example, $LiCoO_2$), manganese dioxide, lithium-manganese complex oxides (for example, $LiMn_2O_4$ and $LiMnO_2$), lithium-containing nickel oxides (for example, $LiNiO_2$), lithium-containing nickel-cobalt oxides (for example, $LiNi_{0.8}Co_{0.2}O_2$), lithium-containing iron oxides, and lithium-containing vanadium oxides, and chalcogenides such as titanium disulfide and molybdenum disulfide.

No particular limitation is imposed on the negative electrode active material, and examples of the negative electrode active material may include graphite materials or carbonaceous materials (for example, graphite, cokes, carbon fiber, spheroidal carbon, thermal decomposition vapor phase carbonaceous materials, and resin burned material), chalcogenides (for example, titanium disulfide, molybdenum disulfide, and niobium selenide), light metals (for example, aluminum, aluminum alloys, magnesium alloys, lithium, and lithium alloys), and lithium-titanium oxides (for example, a spinel type lithium titanate).

Examples of the conductive agent may include, though not particularly limited to, graphite, carbonaceous materials, acetylene black, and carbon black. No particular limitation is imposed on the binder and a polytetrafluoroethylene (PTFE), polyvinylidene fluoride (PVdF), fluoro rubber, or the like may be used.

As the strip current collector, a metal foil may be used. Examples of the metal foil may include an aluminum foil, aluminum alloy foil, and copper foil. The thickness of the strip current collector may be designed to be 50 μm or less.

Then, the obtained strip electrode plate 25 is inserted into the space between the press rolls 21a and 21b rotating in the direction of the arrow shown in FIG. 1 to perform compression molding. Because the strip electrode plate 25 is inserted in parallel to the longitudinal direction of the strip electrode plate 25, the pressure of the press machine is applied primarily to the active material-containing layer 25b, so that the active material-containing layer 25b is compression-molded, resulting in increased density. Because the pressure of the press machine is not almost applied to the current collector exposed portion 25a, the current collector exposed portion is more reduced in elongation than the current collector lying under the active material-containing layer 25b. As a result, the strip electrode plate 25 gives rise to distortion and warpage.

The strip electrode plate 25 which has passed through between the press rolls 21a and 21b is conveyed to the winder 23 via the guide rollers $24_1$ to $24_5$. In the guide roller $24_3$ doubling as the curvature compensator, the boundary between the current collector exposed portion 25a and the active material-containing layer 25b is positioned at a boundary X between the step portion 26 and the recessed portion 27 and only the current collector exposed portion 25a is disposed on the step portion 26 as shown in FIG. 2 and FIG. 3. The active material-containing layer 25b is disposed on the recessed portion 27. This ensures that the winding tension applied to the strip electrode plate 25 in the direction of the conveyance (longitudinal direction) can be concentrated on the current collector exposed portion 25a. As a result, the current collector exposed portion 25a can be sufficiently stretched by winding tension and therefore, the generated distortion and warpage of the strip electrode plate 25 can be corrected. The strip electrode plate 25 which has passed through the guide roller $24_3$ is wound by the winder 23 via the guide rollers $24_4$ and $24_5$. Then, the hoop-shaped strip electrode plate 25 is cut into a desired size according to the need to obtain an electrode. In this case, the strip electrode plate 25 may be used as an electrode as it is.

In the strip electrode plate 25 before compression molding, the whole strip current collector is not stretched. Therefore, when the strip electrode plate 25 before compression molding is brought into contact with the guide roller $24_3$, winding force (stress) is dispersed not only into the current collector exposed portion 25a on the step portion 26 but also into the active material-containing layer 25b. After the compression molding, the current collector lying under the active material-containing layer 25b is stretched and loosened. Therefore, the winding tension (stress) is not almost applied to the current collector lying under the active material-containing layer 25b, so that the winding tension can be concentrated on the unstretched current collector exposed portion 25a. At this time, the distortion of the electrode when the electrode is rewound by the winder 23 with the same tensile force as the winding tension measured when the electrode is compressed can be reduced by about 10% than the distortion measured after the compression.

If the active material-containing layer 25b is disposed on the step portion 26 of the guide roller $24_3$, the winding tension is also dispersed into the active material-containing layer 25b. There is therefore a fear that the winding tension applied to the current collector exposed portion 25a becomes insufficient, and also, the already stretched current collector lying under the active material-containing layer 25b is further stretched, which prevents the compensation of the distortion and warpage of the electrode.

The height H (%) of the step portion 26 formed in the guide roller $24_3$ preferably satisfies the following equation (1) when the thickness of the active material-containing layer on one surface of the strip current collector is 100%. Here, the thickness of the active material-containing layer on one surface of the strip current collector means the thickness of the active material-containing layer on one surface of the strip current collector in the electrode product.

$$150 \leq H \leq 600 \tag{1}$$

When the height H is designed to be 150% or more, stress can be sufficiently concentrated on the current collector exposed portion to stretch it. Also, when the height H is designed to be 600% or less, the generation of wrinkles and cracks in the vicinity of the boundary between the active material-containing layer 25b and the current collector exposed portion 25a can be limited. There is a fear that these wrinkles and cracks are causes of electrode breakage and inferior welding in the subsequent process. Therefore, if the height H is designed to be in a range from 150% to 600%, the generation of wrinkles and cracks in the vicinity of the boundary between the active material-containing layer 25b and the current collector exposed portion 25a can be limited and at the same time, stress can be sufficiently concentrated on the current collector exposed portion. The following range of the height H: $200 \leq H \leq 400$ is more preferable to improve the effect of preventing wrinkles and cracks.

The corner of the step portion 26 disposed in the guide roller $24_3$ may have a right angle or almost right angle and may have a taper shape, as shown in (b) of FIG. 2. The taper is preferably formed at the part where the boundary X between the step portion 26 and the recessed portion 27 crosses the upper surface of the step portion 26. The taper R (mm) preferably satisfies the following range: $R \leq 15$. If the taper R is designed to be 15 mm or less, the current collector exposed portion can be stretched by the sufficient stress concentrated to the current collector exposed portion. As the taper R becomes smaller, the effect of stretching the current collector exposed portion is increased. However, there is a fear that, for example, electrode breakage is caused when the electrode is meandered, and therefore, R is more preferably in the following range: $0.5 \leq R \leq 7$.

The taper R is calculated by plotting several points of the R-surface of the R-part of the step portion 26 on coordinates by a three-dimensional coordinate measuring machine. As the three-dimensional coordinate measuring machine, a 3D coordinate measuring machine (model: WMM550, produced by Carl Zeiss) may be used.

In at least the curvature correcting step, the tensile stress F (N/mm$^2$) at the section parallel to the direction of the short side of the strip electrode plate 25 preferably satisfies the following range: $20 \leq F \leq 100$. When the tensile stress F is designed to be 20 (N/mm$^2$) or more, the current collector exposed portion can be sufficiently stretched while satisfying the stress necessary to wind up the electrode with high accuracy. When the tensile stress F is designed to be 100 (N/mm$^2$) or less, the current collector exposed portion can be sufficiently stretched without giving rise to any problem concerning electrode breakage and deteriorated winding accuracy. Therefore, when the tensile stress F (N/mm$^2$) is designed to be in the following range: $20 \leq F \leq 100$, the current collector exposed portion can be sufficiently stretched while winding up the electrode with high accuracy without giving rise to any problem concerning electrode breakage. The tensile stress F is more preferably in the following range: $20 \leq F \leq 40$, to improve the effect of preventing both of electrode breakage and deterioration in winding accuracy though depending on the conditions such as the aforementioned height H and taper R.

The curvature correction of the strip electrode plate is preferably made with carrying out heating treatment at 60° C. to 150° C. When the heating treatment temperature T is 60° C. or more, the effect of reducing the stress required for plastic deformation can be heightened. Also, when the stress applied to the strip electrode plate is the same, the effect of correcting the distortion and warpage of the electrode can be improved by heating. These effects are obtained more easily when the heating treatment temperature T is higher. However, the heating treatment temperature T is preferably in a range from 60° C. to 150° C. to avoid heat deterioration of the active material-containing layer.

Although a press roll is used as the press machine 21 in FIG. 1, any machine may be used in place of the press roll insofar as it can densify the active material-containing layer. For example, a plate press machine may be used in place of the press roll. Also, the pressing step may be carried out by varying the pressing pressure in a multistep sequence.

Although, in FIG. 1, one guide roller among a plurality of guide rollers is used as the curvature compensator, the number of guide rollers used as the curvature compensator is not limited to one, but all or a plurality of the guide rollers may be used as the curvature compensator. Also, the position of the guide roller to be used as the curvature compensator is not limited to that of the guide roller 24$_3$ located at the third position from the front stage, but a guide roller located at an optional position may be used.

Although, in FIG. 2, the step portion 26 projected from the circumferential surface at one end of the rotating shaft of the guide roller 24$_3$ is formed, the method of forming the step portion is not limited to this and any method may be used as long as the effect of stretching the current collector exposed portion is obtained. For example, as shown in FIG. 4, a ring-like step portion 26 projected from the circumference surface is formed in the vicinity of the center in the direction of the rotating shaft (longitudinal direction of the roller) and the circumference surface on both sides adjacent to the step portion 26 may be a recessed portion 27.

In FIGS. 2 to 4, the current collector exposed portion is disposed on only one of the long sides of the strip electrode plate. However, the current collector exposed portion may be disposed on each long side of the strip electrode plate. When the current collector exposed portion is disposed on each long side of the strip electrode plate, the effect of preventing the warpage and distortion of the electrode can be more improved. When, as shown in FIG. 2, the current collector exposed portion is formed on only one long side of the strip electrode plate, on the other hand, high battery capacity and energy density can be obtained.

In FIGS. 2 to 4, the active material-containing layer is formed on each surface of the strip electrode plate. However, the active material-containing layer may be formed on only one surface of the strip electrode plate.

Though, in FIGS. 2 to 4, the active material-containing layer is formed continuously in the direction of the long side of the strip electrode plate, the active material-containing layer may be formed intermittently in the direction of the long side of the strip current collector and a portion where the active material-containing layer is not formed may be formed between the active material-containing layers.

According to the first embodiment explained above, the strip electrode plate which has been compression-molded is disposed such that the current collector exposed portion is positioned at the step portion of the roller and the active material-containing layer is positioned on the recessed portion of the roller, to apply tensile force to the strip electrode plate in the direction of the long side of the strip electrode plate. Therefore, the tensile force can be concentrated on the current collector exposed portion, so that the current collector exposed portion can be plastically deformed and sufficiently stretched. This enables the correction of distortion and warpage generated in the electrode by compression molding. Also, the breakage of the electrode when manufacturing an electrode group can be prevented. As a result, a high-quality electrode can be produced with high productive efficiency.

Second Embodiment

Figure 5:
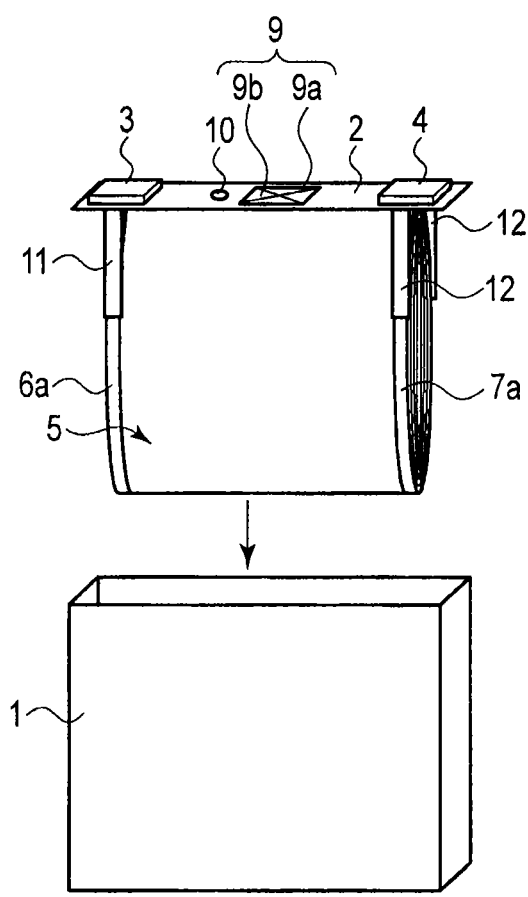
FIG. 5 is an exploded perspective view of a battery produced by a method according to a second embodiment.
Figure 6:
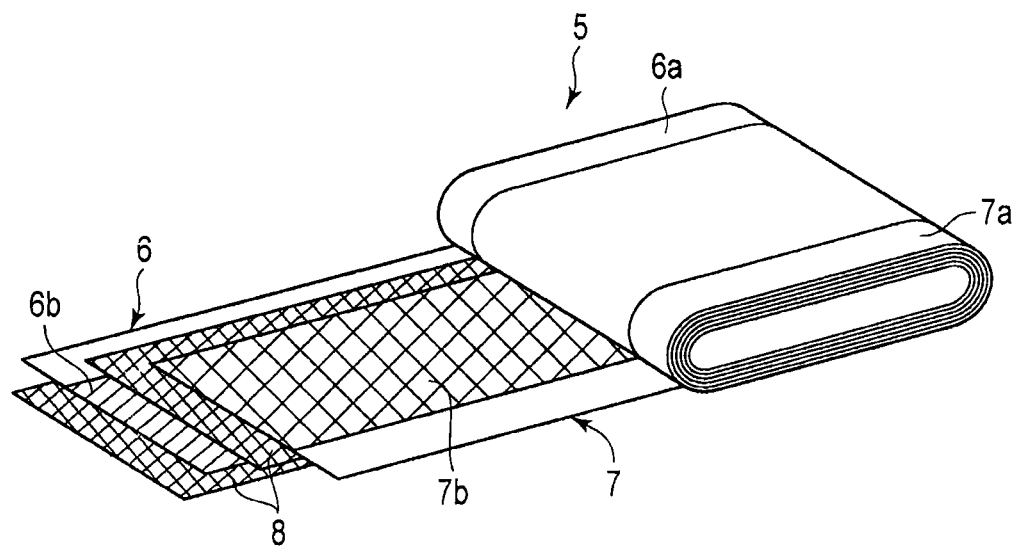
FIG. 6 is a partially exploded perspective view of an electrode group used in a battery shown in FIG. 5.

According to a second embodiment, a method for producing a battery provided with a positive electrode, a negative electrode, and a nonaqueous electrolyte is provided. At least one of these positive and negative electrodes is produced by the method according to the first embodiment. FIG. 5 is an exploded perspective view of a nonaqueous electrolyte battery produced by the method according to the second embodiment. FIG. 6 is a partially exploded perspective view of an electrode group used in the battery shown in FIG. 5.

The battery shown in FIG. 5 is a closed and angular type nonaqueous electrolyte secondary battery. The nonaqueous electrolyte secondary battery includes an package can 1, a lid 2, a positive electrode output terminal 3, a negative electrode output terminal 4, and an electrode group 5. As shown in FIG. 5, the package can 1 has a cylinder shape with bottom and is formed from metals, for example, aluminum, an aluminum alloy, iron, or stainless.

As shown in FIG. 6, the flat-type electrode group 5 is produced by winding up a positive electrode 6 and a negative electrode 7 with a separator 8 being interposed therebetween in a flat form. The positive electrode 6 includes a strip positive electrode current collector made of a metal foil, a positive electrode current collector tab 6a made from a current collector exposed portion of the positive electrode current collector, and a positive electrode active material layer 6b formed on the positive electrode current collector except for the part of at least the positive electrode current collector tab 6a. The negative electrode 7, in turn, includes a strip negative electrode current collector made of a metal foil, a negative electrode current collector tab 7a made from a current collector exposed portion of the negative electrode current collector, and a negative electrode active material layer 7b formed on the negative electrode current collector except for the part of at least the negative electrode current collector tab 7a.

These positive electrode 6, separator 8, and negative electrode 7 are wound in such a manner that the positive electrode 6 and the negative electrode 8 are made to get out of position, so that the positive electrode current collector tab 6a is projected from the separator 8 in the direction of the winding axis of the electrode group and the negative electrode current collector tab 7a is projected from the separator 8 in the opposite direction. Such a winding system ensures that the electrode group 5, as shown in FIG. 6, has a structure in which the spirally wound positive electrode current collector tab 6a is projected from one end surface and the spirally wound negative electrode current collector tab 7a is projected from the other.

The electrode group 5 is impregnated with an electrolytic solution (not shown). The rectangular plate-like lid 2 is seam-welded to an opening of the package can 1 by, for example, a laser. The lid 2 is formed of a metal such as aluminum, an aluminum alloy, iron or stainless. The lid 2 and the package can 1 are preferably formed of the same kind of metal.

As shown in FIG. 5, a relief valve 9 is disposed in the vicinity of the center of the outer surface of the lid 2. The relief valve 9 includes a rectangular recessed portion 9a disposed on the outer surface of the lid 2 and an X-shaped groove portion 9b disposed in the recessed portion 9a. The groove portion 9b is formed by press-molding the lid 2 in the direction of the plate thickness. A liquid injection port 10 is opened in the lid 2 and sealed after the electrolytic solution is injected.

On the outer surface of the lid 2, positive and negative electrode output terminals 3 and 4 are secured to both sides with the relief valve 9 being interposed therebetween by caulking through an insulation gasket (not shown). In the case of a lithium ion secondary battery using a carbon type material as the negative electrode active material, for example, aluminum or an aluminum alloy is used as the positive electrode output terminal 3, and a metal, for example, copper, nickel, or iron plated with nickel is used as the negative electrode output terminal 4. Also, when lithium titanate is used as the negative electrode active material, aluminum or an aluminum alloy besides the above may be used as the negative electrode output terminal 4.

A positive electrode lead 11 has a structure in which one end thereof is secured and electrically connected to the positive electrode output terminal 3 by caulking or welding and other end is electrically connected to the positive electrode current collector tab 6a. A negative electrode lead 12 has a structure in which one end thereof is secured and electrically connected to the negative electrode output terminal 4 by caulking or welding and other end is electrically connected to the negative electrode current collector tab 7a. Examples of the method of electrically connecting the positive and negative electrode leads 11 and 12 to the positive and negative electrode current collector tabs 6a and 7a include, though not particularly limited to, welding methods such as ultrasonic welding and laser welding.

The positive electrode output terminal 3 is electrically connected to the positive electrode current collector tab 6a through the positive electrode lead 11 and the negative electrode output terminal 4 is electrically connected to the negative electrode current collector tab 7a through the negative electrode lead 12 in this manner, with the result that current is extracted from the positive and negative electrode output terminals 3 and 4.

The material of the positive and negative electrode leads 11 and 12 are, though not particularly limited to, desirably the same as that of the positive and negative electrode output terminals 3 and 4. When the material of the output terminal is aluminum or an aluminum alloy, the material of the lead is preferably aluminum or an aluminum alloy. Also, when the output terminal is copper, the material of the lead is preferably copper.

Here, the separator and nonaqueous electrolyte will be explained.

No particular limitation is imposed on the separator and for example, a microporous film, woven fabric, nonwoven fabric, or laminates of the same materials or different materials among these materials may be used. Examples of the material of the separator include a polyethylene, polypropylene, ethylene/propylene copolymer, ethylene/butene copolymer, and cellulose.

As the nonaqueous electrolyte, nonaqueous electrolyte solutions prepared by dissolving an electrolyte (for example, a lithium salt) in a nonaqueous solvent may be used. Examples of the nonaqueous solvent may include ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofuran (THF), and 2-methyltetrahydrofuran. These nonaqueous solvents may be used either singly or in combinations of two or more. Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), and lithium trifluoromethanesulfonate ($LiCF_3SO_3$). These electrolytes may be used either singly or in combinations of two or more. The amount of the electrolyte to be dissolved in the nonaqueous solvent is preferably designed to be 0.2 mol/L to 3 mol/L. When the concentration of the electrolyte is too low, there is the case where only insufficient ion conductivity can be obtained. When the concentration of the electrolyte is too high, there is the case where the electrolyte is imperfectly dissolved in the electrolytic solution.

According to the second embodiment explained above, the compression-molded strip electrode plate is arranged such that the current collector exposed portion is positioned at the step portion of the roller and the active material-containing layer is positioned at the recessed portion of the roller to apply tensile force in the direction of the long side of the strip electrode plate. Therefore, the tensile force can be concentrated on the current collector exposed portion, ensuring that the current collector exposed portion can be sufficiently stretched by plastic deformation. This enables the correction of the distortion and warpage generated in the electrode by compression molding. Also, the problems caused in the process of producing a winding-type electrode group as to the breakage of the electrode, weaving, and wrinkles and cracks can be solved, which enables the realization of the production of an electrode superior in quality and production efficiency.

Third Embodiment

According to a third embodiment, a method for producing an electrode can be provided, the method involving the production of a strip electrode plate, compression molding, first curvature correction, drying and second curvature correction.

Figure 9:
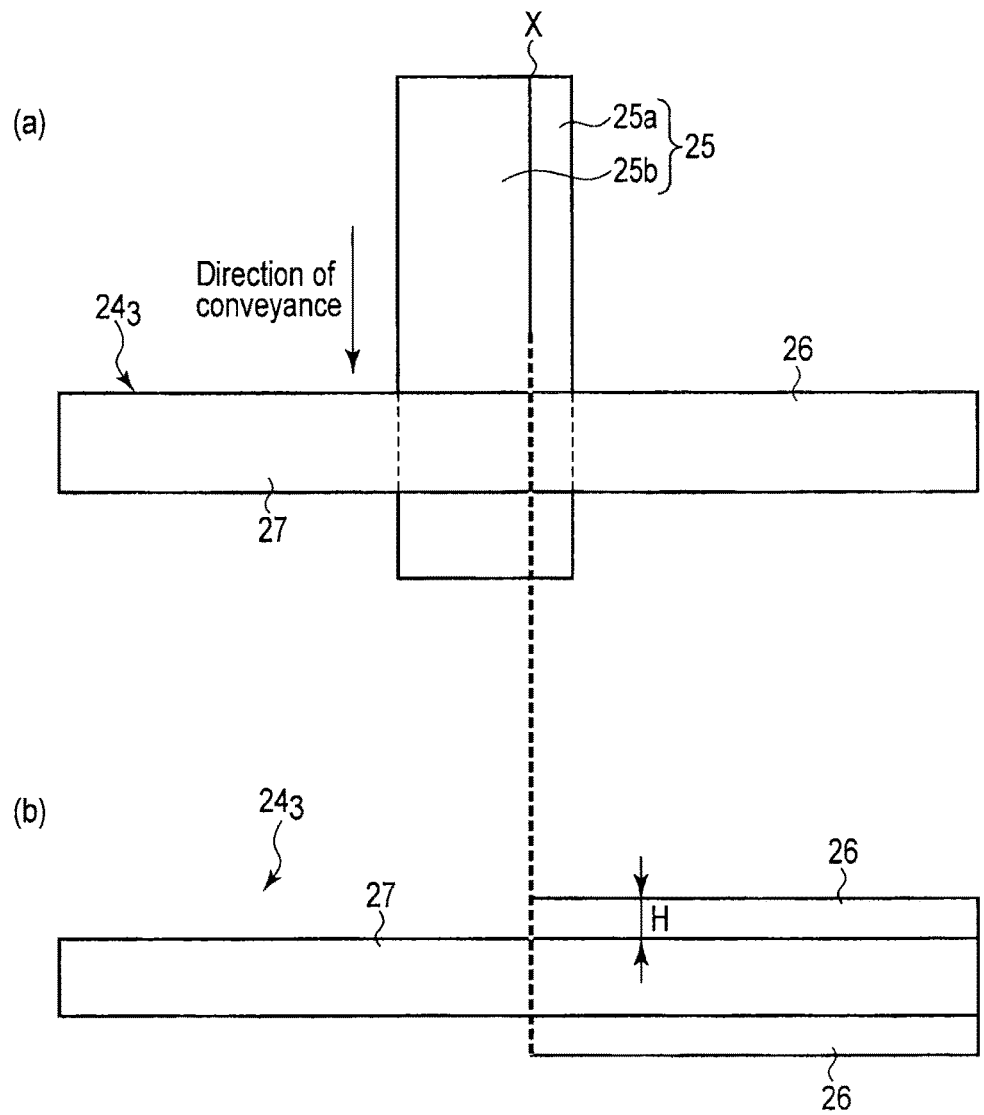
FIG. 9 is a typical view showing the positional relation between a guide roller and a strip electrode plate in FIG. 8.
Figure 10:
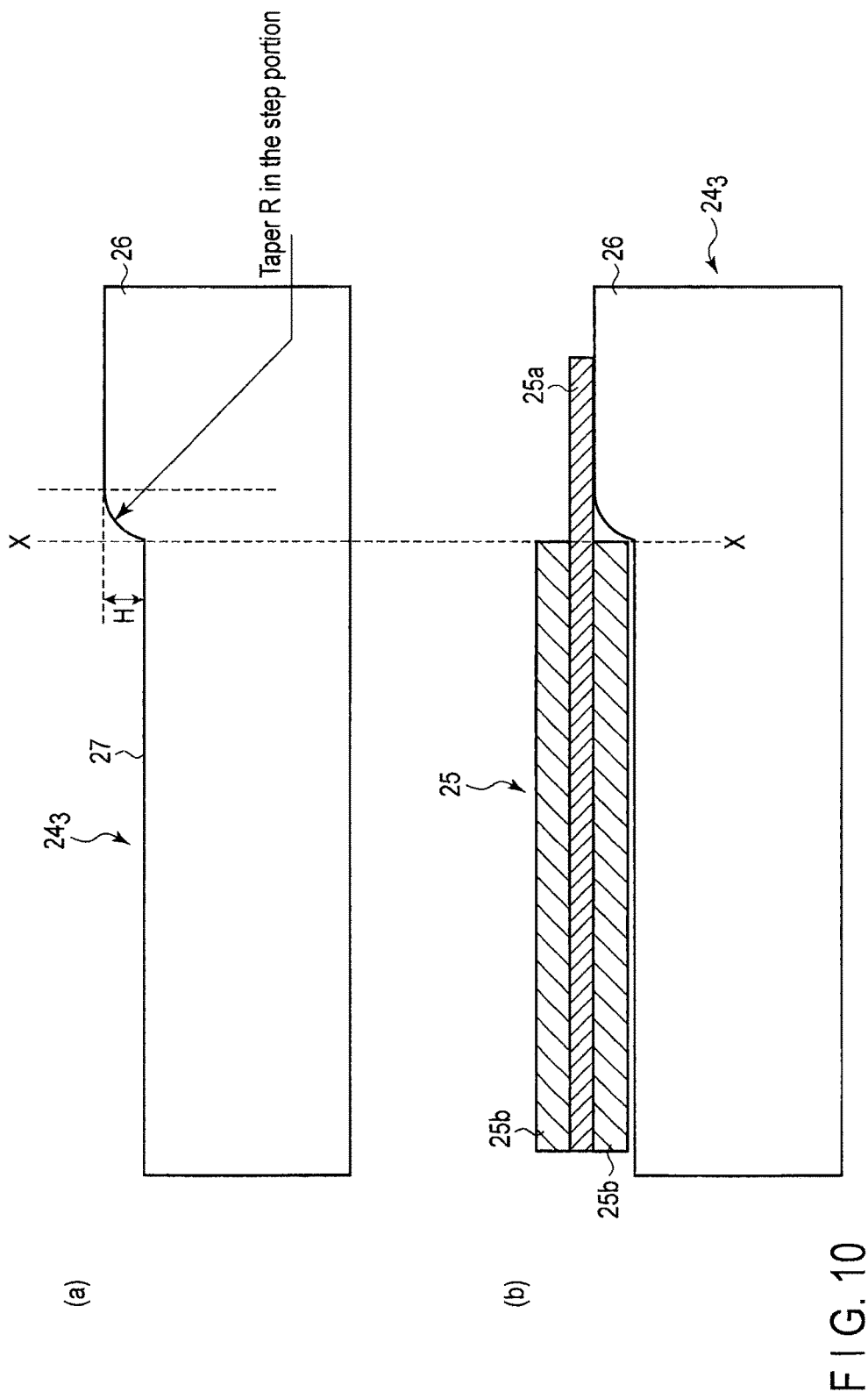
FIG. 10 is a sectional view showing the positional relation between a strip electrode plate and a guide roller which is used in the third embodiment.
Figure 11:
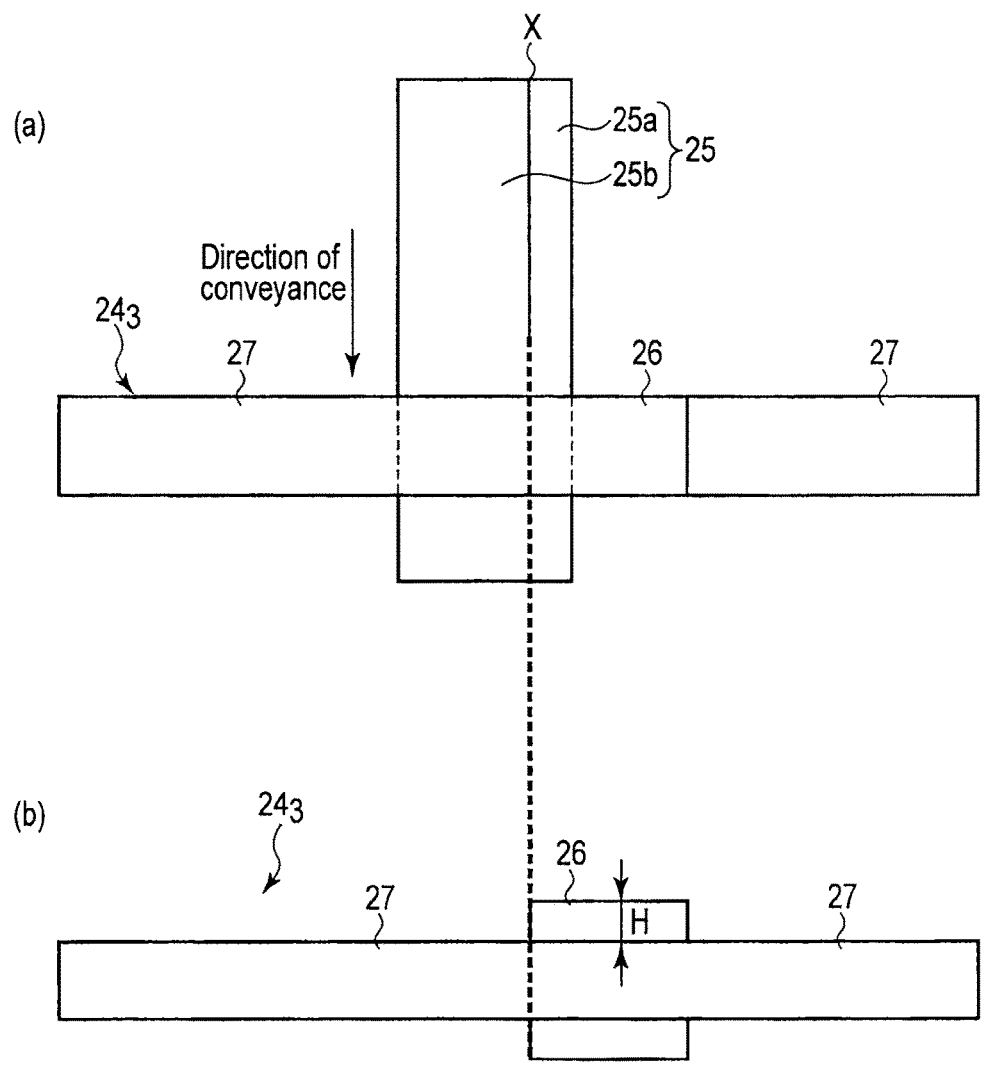
FIG. 11 is a sectional view showing the positional relation between a strip electrode plate and a guide roller which is used in the third embodiment.

FIG. 8 is a typical view showing a press machine used for the production of an electrode, a guide roller, and a first winder. FIG. 9 is a typical view showing the positional relation between the guide roller and the strip electrode plate in the curvature correction step. (a) of FIG. 9 is a plan view of the strip electrode plate running on the guide roller as viewed from the guide roller side, and (b) of FIG. 9 is a sectional view obtained by cutting the guide roller in parallel to the rotating shaft. (a) of FIG. 10 is a sectional view obtained by cutting the guide roller having a taper formed at the corner of the step portion, in parallel to the rotating shaft, and (b) of FIG. 10 is a sectional view showing the situation where the strip electrode plate is disposed on the guide roller shown in (a) of FIG. 10. (a) of FIG. 11 is a plane view of the strip electrode plate running on the guide roller as viewed from the guide roller side, and (b) of FIG. 11 is a sectional view obtained by cutting the guide roller in parallel to the rotating shaft. FIG. 12 is a typical view showing a feeder and a second winder which are used to produce an electrode.

First, the following explanations are furnished as to the production of the strip electrode plate, compression molding, and first curvature correction.

As shown in FIG. 8, a press machine 21, a guide roller 22 and a first winder $23_1$ are arranged in order from the front stage to the last stage. The press machine 21 includes a pair of press rolls 21a and 21b. These press rolls 21a and 21b are rotated in the direction of the arrow shown in FIG. 8 by a driving section (not shown) to thereby compression-mold a strip electrode plate 25 inserted between the press rolls 21a and 21. The first winder $23_1$ is so configured that a rotating shaft 23a is rotated in the direction of the arrow shown in FIG. 8 by a driving section (not shown) to thereby wind the strip electrode plate 25 in a reel state. The guide roller 22 serves to transport the strip electrode plate 25 from the press machine 21 to the first winder $23_1$, and includes a plurality of metal guide rollers $24_1$ to $24_5$ (slave rollers). Tensile force (winding tension) in a longitudinal direction is applied to the strip electrode plate 25 carried from the press rolls 21a and 21b to the first winder $23_1$. The guide rollers $24_1$ to $24_5$ are arranged alternately on the upper and lower surfaces of the strip electrode plate 25 such that the tensile force applied to the strip electrode plate 25 falls within a desired range adequate to winding. The guide roller $24_3$ doubles as a curvature compensator. The guide roller $24_3$ includes a step portion 26 projected from the circumferential surface at one end in the direction of the rotating shaft as shown in (b) of FIG. 9. In the guide roller $24_3$, the remaining part adjacent to the step portion 26 constitutes a recessed portion 27.

(Production of a Strip Electrode Plate)

First, the strip electrode plate 25 is produced. The strip electrode plate 25 includes, as shown in (a) of FIG. 9 and (b) of FIG. 10, a strip current collector, a current collector exposed portion 25a which is formed on one of the long sides of the strip current collector and provided with no active material-containing layer on each surface thereof, and an active material-containing layer 25b formed on each surface of the strip current collector except for the current collector exposed portion 25a. The active material-containing layer 25b is formed continuously in the longitudinal direction of the strip current collector. The width in the direction of the short side is wider in the active material-containing layer 25b than in the current collector exposed portion 25a. The strip electrode plate 25 is obtained by applying an active material-containing slurry to both surfaces of the strip current collector except for one of the long sides, followed by drying. Or, the strip electrode plate 25 is obtained by applying an active material-containing slurry to a part of each surface of the current collector, by drying the slurry, and then by cutting such that the uncoated part which is to be the current collector exposed portion is positioned on the long side.

The active material-containing slurry is prepared, for example, by adding a conductive agent and a binder according to the need to an active material and by kneading these ingredients in the presence of a solvent. As the active material, any of materials for positive electrode and negative electrode may be used.

No particular limitation is imposed on the positive electrode active material and examples of the positive electrode active material may include various oxides such as lithium-containing cobalt oxides (for example, $LiCoO_2$), manganese dioxide, lithium-manganese complex oxides (for example, $LiMn_2O_4$ and $LiMnO_2$), lithium-containing nickel oxides (for example, $LiNiO_2$), lithium-containing nickel-cobalt oxides (for example, $LiNi_{0.8}Co_{0.2}O_2$), lithium-containing iron oxides, and lithium-containing vanadium oxides, and chalcogenides such as titanium disulfide and molybdenum disulfide.

No particular limitation is imposed on the negative electrode active material, and examples of the negative electrode active material may include graphite materials or carbonaceous materials (for example, graphite, cokes, carbon fiber, spheroidal carbon, thermal decomposition vapor phase carbonaceous materials, and resin burned material), charcogenides (for example, titanium disulfide, molybdenum disulfide, and niobium selenide), light metals (for example, aluminum, aluminum alloys, magnesium alloys, lithium, and lithium alloys), and lithium-titanium oxides (for example, a spinel type lithium titanate).

Examples of the conductive agent may include, though not particularly limited to, graphite, carbonaceous materials, acetylene black, and carbon black. No particular limitation is imposed on the binder and a polytetrafluoroethylene (PTFE), polyvinylidene fluoride (PVdF), fluoro rubber, or the like may be used.

As the strip current collector, a metal foil may be used. Examples of the metal foil may include an aluminum foil, aluminum alloy foil, and copper foil. The thickness of the strip current collector may be designed to be 50 μm or less.

(Compression Molding)

Then, the obtained strip electrode plate 25 is inserted between the press rolls 21a and 21b rotated in the direction of the arrow shown in FIG. 8 to compression-mold the strip electrode plate 25. Since the direction in which the strip electrode plate 25 is inserted is parallel to the longitudinal direction of the strip electrode plate 25, the pressure of the press machine is primarily applied to the active material-containing layer 25b, so that the active material-containing layer 25b is compression-molded, leading to increased density. Since the pressure of the press machine is not almost applied to the current collector exposed portion 25a, the current collector exposed portion 25a is more reduced in elongation than the current collector lying under the active material-containing layer 25b. This results in the generation of distortion and warpage in the strip electrode plate 25.

(First Curvature Correction)

The strip electrode plate 25 which has passed through between the press rolls 21a and 21b is conveyed to a first winder $23_1$ via the guide rollers $24_1$ to $24_5$. In the guide roller $24_3$ doubling as the curvature compensator, the boundary between the current collector exposed portion 25a and the active material-containing layer 25b is positioned at a boundary X between the step portion 26 and the recessed portion 27 and only the current collector exposed portion 25a is disposed on the step portion 26, as shown in FIG. 9 and FIG. 10. The active material-containing layer 25b is disposed on the recessed portion 27. This ensures that the winding tension applied to the strip electrode plate 25 in the direction of the conveyance (longitudinal direction) can be concentrated on the current collector exposed portion 25a. As a result, the current collector exposed portion 25a can be sufficiently stretched by winding tension and therefore, the generated distortion and warpage of the strip electrode plate 25 can be corrected. The strip electrode plate 25 which has passed through the guide roller $24_3$ is wound by the first winder $23_1$ via the guide rollers $24_4$ and $24_5$.

In the strip electrode plate 25 before compression molding, the whole strip current collector is not stretched. Therefore, when the strip electrode plate 25 before compression molding is brought into contact with the guide roller $24_3$, winding tension (stress) is dispersed not only into the current collector exposed portion 25a on the step portion 26 but also into the active material-containing layer 25b. After the compression molding, the current collector lying under the active material-containing layer 25b is stretched and loosened. Therefore, the winding tension (stress) is not almost applied to the current collector lying under the active material-containing layer 25b, so that the winding tension can be concentrated on the unstretched current collector exposed portion 25a. At this time, the distortion of the electrode when the electrode is rewound by the first winder $23_1$ with the same tensile force as the winding tension measured when the electrode is compressed can be reduced by about 10% than the distortion measured after the compression.

If the active material-containing layer 25b is disposed on the step portion 26 of the guide roller $24_3$, the winding tension is also dispersed into the active material-containing layer 25b. There is therefore a fear that the winding tension applied to the current collector exposed portion 25a becomes insufficient, and also, the already stretched current collector lying under the active material-containing layer 25b is further stretched, which prevents the compensation of the distortion and warpage of the electrode.

The height H (%) of the step portion 26 formed in the guide roller $24_3$ preferably satisfies the following equation (1) when the thickness of the active material-containing layer on one surface of the current collector is 100%. Here, the thickness of the active material-containing layer on one surface of the current collector means the thickness of the active material-containing layer on one surface of the current collector in the electrode product.

$$150 \leq H \leq 600 \quad (1)$$

When the height H is designed to be 150% or more, stress can be sufficiently concentrated on the current collector exposed portion to stretch it. Also, when the height H is designed to be 600% or less, the generation of wrinkles and cracks in the vicinity of the boundary between the active material-containing layer 25b and the current collector exposed portion 25a can be limited. There is a fear that these wrinkles and cracks are causes of electrode breakage and inferior welding. Therefore, if the height H is designed to be in a range from 150% to 600%, the generation of wrinkles and cracks in the vicinity of the boundary between the active material-containing layer 25b and the current collector exposed portion 25a can be limited and at the same time, stress can be sufficiently concentrated on the current collector exposed portion to stretch the current collector exposed portion. The following range of the height H: $200 \leq H \leq 400$ is more preferable to improve the effect of preventing wrinkles and cracks.

The corner of the step portion 26 disposed in the guide roller $24_3$ may have a right angle or almost right angle or may have a taper shape, as shown in (b) of FIG. 9. The taper is preferably formed at the part where the boundary X between the step portion 26 and the recessed portion 27 crosses the upper surface of the step portion 26, as shown in (a) and (b) of FIG. 10. The taper R (mm) preferably satisfies the following range: $R \leq 15$. If the taper R is designed to be 15 mm or less, the current collector exposed portion can be stretched by the sufficient stress concentrated. As the taper R becomes smaller, the effect of stretching the current collector exposed portion is increased. However, there is a fear that, for example, electrode breakage is caused when the electrode is meandered, and therefore, the R is more preferably in the following range: $0.5 \leq R \leq 7$.

The taper R is calculated by plotting several points of the R-surface of the R-part of the step portion 26 on coordinates by a three-dimensional coordinate measuring machine. As the three-dimensional coordinate measuring machine, a 3D coordinate measuring machine (model: WMM550, produced by Carl Zeiss) may be used.

In at least the curvature correcting step, the tensile stress F (N/mm$^2$) at the section parallel to the direction of the short side of the strip electrode plate 25 preferably satisfies the following range: $20 \leq F \leq 100$. When the tensile stress F is designed to be 20 (N/mm$^2$) or more, the current collector exposed portion can be sufficiently stretched while satisfying the stress necessary to wind up the electrode with high accuracy. When the tensile stress F is designed to be 100 (N/mm$^2$) or less, the current collector exposed portion can be sufficiently stretched without giving rise to any problem concerning electrode breakage and deteriorated winding accuracy. Therefore, when the tensile stress F (N/mm$^2$) is designed to be in the following range: $20 \leq F \leq 100$, the current collector exposed portion can be sufficiently stretched while winding up the electrode with high accuracy without electrode breakage. The tensile stress is more preferably in the following range: $20 \leq F \leq 40$, to improve the effect of preventing both of electrode breakage and deterioration in winding accuracy though depending on the conditions including the aforementioned height H and taper R.

The curvature correction of the strip electrode plate is preferably made with carrying out heating treatment at 60° C. to 150° C. When a heating treatment temperature T is 60° C. or more, the effect of reducing the stress required for plastic deformation can be heightened. Also, when the stress applied to the strip electrode plate is the same, the effect of correcting the distortion and warpage of the electrode can be improved by heating. These effects are obtained more easily when the heating treatment temperature T is higher. However, the heating treatment temperature T is preferably in a range from 60° C. to 150° C. to avoid heat deterioration of the active material-containing layer.

(Drying)

A reel of the strip electrode plate 25 made by the first winder $23_1$ is subjected to drying treatment. The drying treatment is preferably carried out at 100° C. to 180° C. under vacuum, under reduced pressure, or in an atmosphere. When the atmospheric temperature is designed to be 100° C. or more, the removal of water from the strip electrode plate 25 can be promoted. Also, when the drying temperature is designed to be 180° C. or less, the heat deterioration of the material contained in the active material-containing layer can be prevented. Accordingly, when the atmospheric temperature is designed to be in a range from 100° C. to 180° C., the heat deterioration of the material contained in the active material-containing layer can be prevented and at the same time, the removal of water from the strip electrode plate 25 can be promoted.

The drying time is preferably 10 hr or more.

A reel of the strip electrode plate 25 is applied to the tensile force due to winding. The current collector lying under the active material-containing layer 25b is deformed as it follows a variation in the curvature of the active material-containing layer 25b curved by winding and therefore tends to be more affected by tensile force than the current collector exposed portion 25a. If the drying treatment is performed in such a state where tension is applied, plastic deformation is promoted by heating and therefore, the current collector lying under the active material-containing layer 25b is stretched more largely than the current collector exposed portion 25a, with the result that the warpage and distortion of the strip electrode plate 25 are again produced.

(Second Curvature Correction)

A second curvature correction is carried out using the equipment shown in FIG. 12. As shown in FIG. 12, a feeder 28, a plurality of metal guide rollers $24_1$ to $24_4$, and a second winder 29 are arranged in order from the front stage to the last stage in the production process. The feeder 28 is so designed that a rotating shaft 28a is rotated in the direction of the arrow shown in FIG. 12 by a driving section (not shown) to feed the reel of the strip electrode plate 25 in the direction of conveyance. The second feeder 29 is so designed that a rotating shaft 29a is rotated in the direction of the arrow shown in FIG. 12 by a driving section (not shown) to wind up the strip electrode plate 25 to form a reel of the strip electrode plate 25. The plurality of guide rollers $24_1$ to $24_5$ are arranged alternately on the upper and lower surfaces of the strip electrode plate 25 such that the tensile force required for winding is applied to the strip electrode plate 25. As the guide rollers $24_1$ to $24_5$, the same ones as those explained for the first curvature correction are used wherein the guide roller $24_3$ doubles as a curvature compensator.

The strip electrode plate 25 fed from the feeder 28 is conveyed to the guide roller $24_3$ after it passes through the guide rollers $24_1$ to $24_2$. In the guide roller $24_3$, the boundary between the current collector exposed portion 25a and the active material-containing layer 25b is positioned at the boundary X between the step portion 26 and the recessed portion 27 and only the current collector exposed portion 25a is disposed on the step portion 26, as shown in FIG. 9 and FIG. 10. The active material-containing layer 25b is disposed on the recessed portion 27. This ensures that the winding tension applied to the strip electrode plate 25 in the direction of the conveyance (longitudinal direction) can be concentrated on the current collector exposed portion 25a. As a result, the current collector exposed portion 25a can be sufficiently stretched by winding tension and therefore, the generated distortion and warpage of the strip electrode plate 25 can be corrected again. The strip electrode plate 25 which has passed through the guide roller $24_3$ passes through the guide rollers $24_4$. And then, the strip electrode plate 25 is wound by the second winder 29.

A reel of the strip electrode plate 25 made by the second winder 29 is cut into a desired size according to the need to obtain an electrode. The strip electrode plate 25 may be used as an electrode as it is.

Although a press roll is used as the press machine 21 in FIG. 8, any machine may be used in place of the press roll insofar as it can densify the active material-containing layer. For example, a plate press machine may be used in place of the press roll.

Although, in FIGS. 8 and 12, one guide roller among a plurality of guide rollers is used as the curvature compensator, the number of guide rollers used as the curvature compensator is not limited to one, but all or a plurality of the guide rollers may be used as the curvature compensator. Also, the position of the guide roller to be used as the curvature compensator is not limited to that of the guide roller $24_3$ located at the third position from the front stage, but a guide roller located at an optional position may be used.

Although, in FIG. 9, the step portion 26 projected from the circumferential surface at one end in the direction of the rotating shaft of the guide roller $24_3$ is formed, the method of forming the step portion is not limited to this and any method may be used as long as the effect of stretching the current collector exposed portion is obtained. For example, as shown in FIG. 11, a ring-like step portion 26 projected from the circumference surface is formed in the vicinity of the center in the direction of the rotating shaft and the circumference surface on both sides adjacent to the step portion 26 may be a recessed portion 27.

In FIGS. 9 to 11, the current collector exposed portion is disposed on only one of the long sides of the strip electrode plate. However, the current collector exposed portion may be disposed on each long side of the strip electrode plate. When the current collector exposed portion is disposed on each long side of the strip electrode plate, the effect of preventing the warpage and distortion of the electrode can be more improved. When, as shown in FIG. 9, the current collector exposed portion is formed on only one long side of the strip electrode plate, on the other hand, high battery capacity and energy density can be obtained.

In FIGS. 9 to 11, the active material-containing layer is formed on each surface of the strip electrode plate. However, the active material-containing layer may be formed on only one surface of the strip electrode plate.

Though, in FIGS. 9 to 11, the active material-containing layer is formed continuously in the direction of the long side of the strip electrode plate, the active material-containing layer may be formed intermittently in the direction of the long side of the strip current collector and a portion where the active material-containing layer is not formed may be formed between the active material-containing layers.

According to the third embodiment explained above, curvature correction is performed after each of the compression molding and drying steps. In the curvature correction, the strip electrode plate is arranged such that the current collector exposed portion is positioned on the step portion of the roller and the active material-containing layer is positioned on the recessed portion of the roller, to apply tensile force in the longitudinal direction of the strip electrode plate. Therefore, the tensile force can be concentrated on the current collector exposed portion, so that the current collector exposed portion can be plastically deformed and sufficiently stretched. This enables the correction of distortion and warpage generated in the electrode by compression molding and drying steps. As a result, a high-quality electrode can be produced with high productive efficiency.

Fourth Embodiment

According to a fourth embodiment, a method for producing an electrode can be provided, the method comprising the compression molding of the strip electrode plate and curvature correction.

Although the compression molding may be carried out at one time like the case of the third embodiment, it may be performed in multistage. When the compression molding is performed in multistage, the load (pressure) required in each stage is reduced and therefore, the warpage and distortion generated in the electrode in each stage are reduced. When comparing the distortion of the electrode which is generated in the case of compressing the strip electrode plate to an intended thickness (or density) at one time with the distortion (sum of the distortions of the electrode produced in two or more steps) of the electrode which is generated in the case of compressing the strip electrode plate to an intended thickness (or density) in two or more steps, the latter distortion is smaller. Accordingly, an electrode which has neither warpage nor distortion and has a high density can be produced highly efficiently by correcting the curvature after performing multistage compression molding.

When the compression molding is carried out in two or more steps, the warpage and distortion of the electrode can be reduced by performing curvature correction after all of the compression molding steps are finished. It is however possible to more reduce the warpage and distortion of the electrode by performing curvature correction in each compression molding step.

Figure 13:
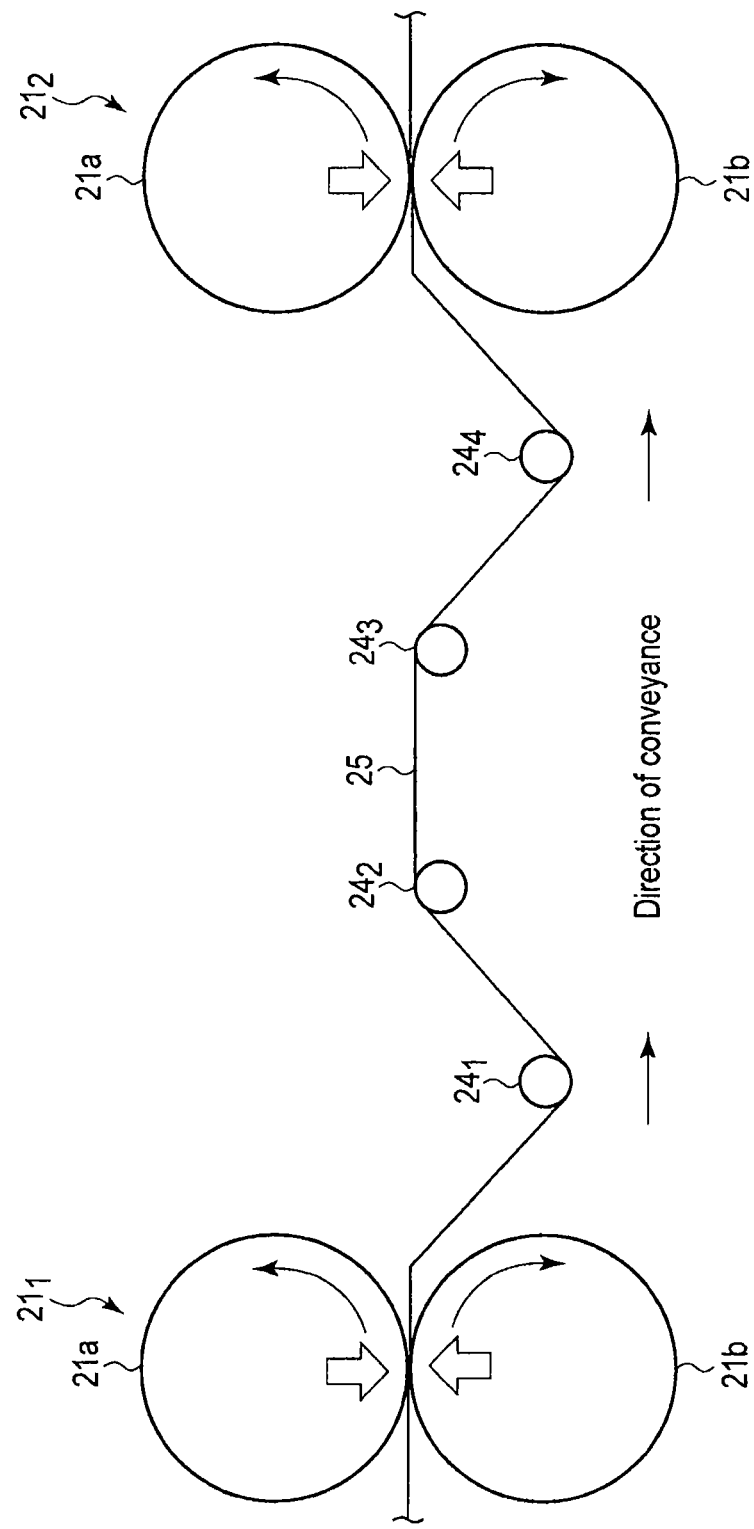
FIG. 13 is a typical view showing a step in a method according to a fourth embodiment.

An example in which the compression molding process is divided into two steps to perform curvature correction in each step will be explained with reference to FIG. 13. FIG. 13 is a typical view showing the press machine and guide roller used in the production of an electrode. As shown in FIG. 13, a first press machine $21_1$, a plurality of metal guide rollers $24_1$ to $24_4$, a second press machine $21_2$ are arranged in order from the front stage to the last stage of the production process. The first and second press machine $21_1$ and $21_2$ are each provided with a pair of press rolls $21a$ and $21b$. These press rolls $21a$ and $21b$ are rotated in the direction of the arrow shown in FIG. 13 by a driving section (not shown) to thereby compression-mold a strip electrode plate 25 inserted between the press rolls $21a$ and $21b$. The plurality of guide rollers $24_1$ to $24_4$ are arranged alternately on the upper and lower surfaces of the strip electrode plate 25 such that the tensile force applied to the strip electrode plate 25 falls within a desired range adequate to conveyance. The same roller as that explained in the first curvature correction is used as the guide rollers $24_1$ to $24_4$ and the guide roller $24_3$ doubles as a curvature compensator. The strip electrode plate which has passed through the second press machine $21_2$ is wound reel-wise by a winder via a guide roll. As the guide roller and winder, those shown in FIG. 8 may be used.

First, the obtained strip electrode plate 25 in the same manner as that explained in the third embodiment is inserted between the press rolls $21a$ and $21b$ of the first press machine $21_1$ to compression-mold the strip electrode plate 25. Since the direction in which the strip electrode plate 25 is inserted is parallel to the longitudinal direction of the strip electrode plate 25, the pressure of the press machine is primarily applied to the active material-containing layer $25b$, so that the active material-containing layer $25b$ is compression-molded, leading to increased density. Since the pressure of the press machine is not almost applied to the current collector exposed portion $25a$, the current collector exposed portion $25a$ is more reduced in elongation than the current collector lying under the active material-containing layer $25b$. This results in the generation of distortion and warpage in the strip electrode plate 25.

The strip electrode plate 25 which has passed through between the press rolls $21a$ and $21b$ of the first press machine $21_1$ is conveyed to the guide roller $24_3$ via the guide rollers $24_1$ to $24_2$. In the guide roller $24_3$, the boundary between the current collector exposed portion $25a$ and the active material-containing layer $25b$ is positioned at the boundary X between the step portion 26 and the recessed portion 27 and only the current collector exposed portion $25a$ is disposed on the step portion 26, as shown in FIG. 9 and FIG. 10. The active material-containing layer $25b$ is disposed on the recessed portion 27. This ensures that the winding tension applied to the strip electrode plate 25 in the direction of the conveyance (longitudinal direction) can be concentrated on the current collector exposed portion $25a$. As a result, the current collector exposed portion $25a$ can be sufficiently stretched by winding tension and therefore, the generated distortion and warpage of the strip electrode plate 25 can be corrected. The strip electrode plate 25 which has passed through the guide roller $24_3$ is conveyed to the second press machine $21_2$ via the guide roller $24_4$.

The strip electrode plate 25 is inserted between the press rolls $21a$ and $21b$ of the second press machine $21_2$ to perform compression molding. Since the direction in which the strip electrode plate 25 is inserted is parallel to the longitudinal direction of the strip electrode plate 25, the pressure of the press machine is primarily applied to the active material-containing layer $25b$, so that the active material-containing layer $25b$ is compression-molded, leading to increased density. Since the pressure of the press machine is not almost applied to the current collector exposed portion $25a$, the current collector exposed portion $25a$ is more reduced in elongation than the current collector lying under the active material-containing layer $25b$. This results in the generation of distortion and warpage in the strip electrode plate 25.

The strip electrode plate 25 which has passed through the second press machine $21_2$ is conveyed to the winder via a plurality of guide rollers. Because one of the plurality of guide rollers doubles as a curvature compensator, the distortion and warpage generated in the strip electrode plate 25 can be corrected. The reel of the strip electrode plate made by a winder is cut into a desired size according to the need to obtain an electrode. The strip electrode plate may be used as an electrode as it is.

Although, in FIG. 13, the compression molding is carried out in two stages, the number of compression molding steps is not limited to this, and it may be performed in three or more sequential stages. When the compression molding is performed in three or more sequential stages, the curvature of the strip electrode plate is corrected every time when the compression molding in each step is finished, and then, the strip electrode plate 25 is cut into a desired size according to the need to obtain an electrode.

Although a press roll is used as the press machine 21 in FIG. 13, any machine may be used in place of the press roll insofar as it can densify the active material-containing layer. For example, a plate press machine may be used in place of the press roll.

Although, in FIG. 13, one guide roller among a plurality of guide rollers is used as the curvature compensator, the number of guide rollers used as the curvature compensator is not limited to one, but all or a plurality of the guide rollers may be used as the curvature compensator. Also, the position of the guide roller to be used as the curvature compensator is not limited to that of the guide roller $24_3$ located at the third position from the front stage, but a guide roller located at an optional position may be used. Moreover, the position and number of guide rollers to be used as the curvature compensator may be matched in all steps or may be different in each step.

According to the fourth embodiment explained above, a method for producing an electrode is provided, the method including multistage compression molding and curvature correction. The multistage compression molding enables more reduction in the distortion and warpage of the electrode as compared with the case of performing compression molding in one step. Also, in the curvature correction, the strip electrode plate is arranged such that the current collector exposed portion is positioned on the step portion of the roller and the active material-containing layer is positioned on the recessed portion of the roller, to apply tensile force in the longitudinal direction of the strip electrode plate. Therefore, the tensile force can be concentrated on the current collector exposed portion, so that the current collector exposed portion can be plastically deformed and sufficiently stretched. Therefore, the distortion and warpage generated in the electrode can be sufficiently corrected by combining multistage compression molding with curvature correction. As a result, a high-quality electrode can be produced with high productive efficiency.

Fifth Embodiment

Figure 14:
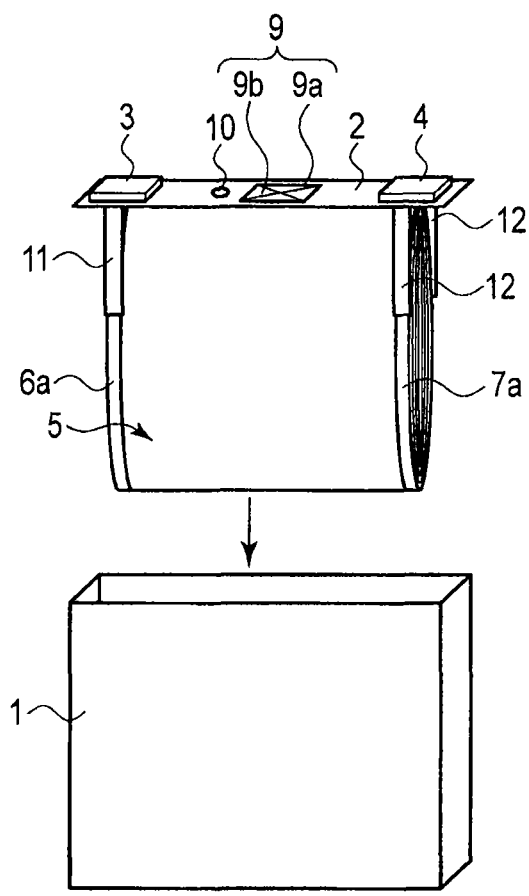
FIG. 14 is an exploded perspective view of a battery produced by a method according to a fifth embodiment.

According to a Fifth embodiment, there is provided a method for producing an electrode including a positive electrode, a negative electrode, and a nonaqueous electrolyte. At least one of the positive and negative electrodes is produced by any one of the methods according to the third and fourth embodiments. FIG. 14 is an exploded perspective view of a nonaqueous electrolyte battery produced by the method according to the third embodiment. FIG. 15 is a partially exploded perspective view of an electrode group used in a battery shown in FIG. 14.

The battery shown in FIG. 14 is a closed and angular type nonaqueous electrolyte secondary battery. The nonaqueous electrolyte secondary battery includes an package can 1, a lid 2, a positive electrode output terminal 3, a negative electrode output terminal 4, and an electrode group 5. As shown in FIG. 14, the package can 1 has a cylinder shape with bottom and is formed from metals, for example, aluminum, an aluminum alloy, iron, or stainless.

As shown in FIG. 15, the flat-type electrode group 5 is produced by winding up a positive electrode 6 and a negative electrode 7 with a separator 8 being interposed therebetween in a flat form. The positive electrode 6 includes a strip positive electrode current collector made of a metal foil, a positive electrode current collector tab 6a made from a current collector exposed portion of the positive electrode current collector, and a positive electrode active material layer 6b formed on the positive electrode current collector except for the part of at least the positive electrode current collector tab 6a. The negative electrode 7, in turn, includes a strip negative electrode current collector made of a metal foil, a negative electrode current collector tab 7a made from a current collector exposed portion of the negative electrode current collector, and a negative electrode active material layer 7b formed on the negative electrode current collector except for the part of at least the negative electrode current collector tab 7a.

These positive electrode 6, separator 8, and negative electrode 7 are wound in such a manner that the positive electrode 6 and the negative electrode 8 are made to get out of position, so that the positive electrode current collector tab 6a is projected from the separator 8 in the direction of the winding axis of the electrode group and the negative electrode current collector tab 7a is projected from the separator 8 in the opposite direction. Such a winding system ensures that the electrode group 5, as shown in FIG. 15, has a structure in which the spirally wound positive electrode current collector tab 6a is projected from one end surface and the spirally wound negative electrode current collector tab 7a is projected from the other.

The electrode group 5 is impregnated with an electrolytic solution (not shown). The rectangular plate-like lid 2 is seam-welded to an opening of the package can 1 by, for example, a laser. The lid 2 is formed of a metal such as aluminum, an aluminum alloy, iron or stainless. The lid 2 and the package can 1 are preferably formed of the same kind of metal.

As shown in FIG. 15, a relief valve 9 is disposed in the vicinity of the center of the outer surface of the lid 2. The relief valve 9 includes a rectangular recessed portion 9a disposed on the outer surface of the lid 2 and an X-shaped groove portion 9b disposed in the recessed portion 9a. The groove portion 9b is formed by press-molding the lid 2 in the direction of the plate thickness. A liquid injection port 10 is opened in the lid 2 and sealed after the electrolytic solution is injected.

On the outer surface of the lid 2, positive and negative electrode output terminals 3 and 4 are secured to both sides with the relief valve 9 being interposed therebetween by caulking through an insulation gasket (not shown). In the case of a lithium ion secondary battery using a carbon type material as the negative electrode active material, for example, aluminum or an aluminum alloy is used as the positive electrode output terminal 3, and a metal, for example, copper, nickel, or iron plated with nickel is used as the negative electrode output terminal 4. Also, when lithium titanate is used as the negative electrode active material, aluminum or an aluminum alloy besides the above may be used as the negative electrode output terminal 4.

A positive electrode lead 11 has a structure in which one end thereof is secured and electrically connected to the positive electrode output terminal 3 by caulking or welding and other end is electrically connected to the positive electrode current collector tab 6a. A negative electrode lead 12 has a structure in which one end thereof is secured and electrically connected to the negative electrode output terminal 4 by caulking or welding and other end is electrically connected to the negative electrode current collector tab 7a. Examples of the method of electrically connecting the positive and negative electrode leads 11 and 12 to the positive and negative electrode current collector tabs 6a and 7a include, though not particularly limited to, welding methods such as ultrasonic welding and laser welding.

The positive electrode output terminal 3 is electrically connected to the positive electrode current collector tab 6a through the positive electrode lead 11 and the negative electrode output terminal 4 is electrically connected to the negative electrode current collector tab 7a through the negative electrode lead 12 in this manner, with the result that current is extracted from the positive and negative electrode output terminals 3 and 4.

The material of the positive and negative electrode leads 11 and 12 are, though not particularly limited to, desirably the same as that of the positive and negative electrode output terminals 3 and 4. When the material of the output terminal is aluminum or an aluminum alloy, the material of the lead is preferably aluminum or an aluminum alloy. Also, when the output terminal is copper, the material of the lead is preferably copper.

Here, the separator and nonaqueous electrolyte will be explained.

No particular limitation is imposed on the separator and for example, a microporous film, woven fabric, nonwoven fabric, or laminates of the same materials or different materials among these materials may be used. Examples of the material of the separator include a polyethylene, polypropylene, ethylene/propylene copolymer, ethylene/butene copolymer, and cellulose.

As the nonaqueous electrolyte, nonaqueous electrolyte solutions prepared by dissolving an electrolyte (for example, a lithium salt) in a nonaqueous solvent may be used. Examples of the nonaqueous solvent may include ethylene carbonate (EC), propylene carbonate (PC), butylene carbonate (BC), dimethyl carbonate (DMC), diethyl carbonate (DEC), ethylmethyl carbonate (EMC), γ-butyrolactone (γ-BL), sulfolane, acetonitrile, 1,2-dimethoxyethane, 1,3-dimethoxypropane, dimethyl ether, tetrahydrofuran (THF), and 2-methyltetrahydrofuran. These nonaqueous solvents may be used either singly or in combinations of two or more. Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), and lithium trifluoromethanesulfonate ($LiCF_3SO_3$). These electrolytes may be used either singly or in combinations of two or more. The amount of the electrolyte to be dissolved in the nonaqueous solvent is preferably designed to be 0.2 mol/L to 3 mol/L. When the concentration of the electrolyte is too low, there is the case where only insufficient ion conductivity can be obtained. When the concentration of the electrolyte is too high, there is the case where the electrolyte is imperfectly dissolved in the electrolytic solution.

According to the fifth embodiment explained above, the strip electrode plate is arranged such that the current collector exposed portion is positioned at the step portion of the roller and the active material-containing layer is positioned at the recessed portion of the roller to apply tensile force in the direction of the long side of the strip electrode plate. Therefore, the tensile force can be concentrated on the current collector exposed portion, ensuring that the current collector exposed portion can be sufficiently stretched by plastic deformation. This enables the correction of the distortion and warpage generated in the electrode in the production process such as compression molding and drying steps. Also, the problems caused in the process of producing a winding-type electrode group, as to the breakage of the electrode, weaving, and wrinkles and cracks can be solved, which enables the realization of the production of an electrode superior in quality and production efficiency.

In this case, the curvature correction is effective not only for the strip electrode plate which has been compression-molded or dried but also in the case where warpage and distortion are generated caused by a difference in elongation between the current collector lying under the active material-containing layer and the current collector exposed portion.

The first and second curvature corrections in the third embodiment and the curvature correction in the fourth embodiment may be performed in the same method as in the case of curvature correction according to the first embodiment.

EXAMPLES

Although the following explanations are furnished as to examples, the embodiment is not limited to the following examples unless another example is beyond the spirit of the embodiment.

Example 1

Examples of a positive electrode and negative electrode for a lithium ion secondary battery are shown.

$LiCoO_2$ as a positive electrode active material, a graphite powder as a conductive agent, and a polyvinylidene fluoride (PVdF) as a binder were mixed and dispersed in an organic solvent to prepare a slurry. The obtained slurry was applied to a strip aluminum foil as a current collector except for both surfaces of one long side, followed by drying to produce a strip positive electrode plate.

$Li_4Ti_5O_{12}$ as a negative electrode active material, a carbon powder as a conductive agent, and a polyvinylidene fluoride (PVdF) as a binder were mixed and dispersed in an organic solvent to prepare a slurry. The obtained slurry was applied to a strip aluminum foil as a current collector except for both surfaces of one long side, followed by drying to produce a strip negative electrode plate.

Each active material-containing layer of the strip positive electrode plate and strip negative electrode plate was compressed by a press machine 21 shown in FIG. 1, and then, wound by a winder 23 to form a hoop after they had passed through a guide roller 22. In the guide roller $24_3$ doubling as a curvature compensator, the boundary between a current collector exposed portion 25a and an active material-containing layer 25b was positioned at the boundary X between a step portion 26 and a recessed portion 27, the current collector exposed portion 25a was disposed on the step portion 26 and also, the active material-containing layer 25b was disposed on the recessed portion 27. Table 1 shows a height H of the step portion 26 and taper R. Also, tensile force (winding tension) was applied to each longitudinal direction of the strip positive electrode plate and strip negative electrode plate since the compression molding step using the press machine 21 until these electrodes were wound up to make a hoop by the winder 23. A tensile force F at the section parallel to the direction of each short side of the strip positive electrode plate and strip negative electrode plate is shown in the following Table 1. With regard to the strip positive electrode plate and strip negative electrode plate, heating treatment was not carried out in the curvature correction step, but curvature correction was performed in a room-temperature (RT) atmosphere.

Figure 7:
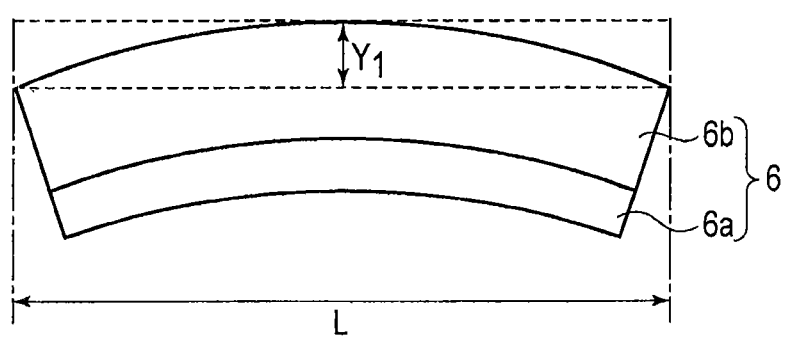
FIG. 7 is a typical view showing a method for measuring the distortion of an electrode in an example.

Pieces having a length of 1 m were cut out of the hoop of the positive electrode plate and the hoop of negative electrode plate respectively to measure each distortion. The distortion is, in the case of a positive electrode 6, a shortest distance $Y_1$ from a point on the line parallel to a length L (1 m) of the positive electrode 6 to the most curved point on the positive electrode 6 as shown in FIG. 7. In the case of a negative electrode 7, the distortion is a shortest distance $Y_2$ from a point on the line parallel to the length L (1 m) of the negative electrode 7 to the most curved point on the negative electrode 7. The results of measurement of the amount of distortion are shown in Table 1.

After the distortion was measured, a separator was disposed between the positive electrode and negative electrode, a positive electrode current collector tab having a current collector exposed portion was made to project from the separator in the direction of the winding axis of the electrode group and also, a negative electrode current collector tab having a current collector exposed portion was made to project from the separator in the opposite direction, which was then wound in a flat state, to thereby produce an electrode group shown in FIG. 6. Investigations were made as to whether or not there was electrode breakage during winding in the process of producing the electrode group and as to whether or not there were the weaving, wrinkles, and cracks of the electrode when taking apart of the produced electrode group. The results are shown in Table 2.

Examples 2 to 18 and Comparative Example 1

The same procedures as in Example 1 were conducted except that a height H of the step portion formed in the guide roller, taper R, tensile stresses F of the strip positive and negative electrode plates, and heating treatment temperature T of the electrode were altered to those shown in Table 1. The results are shown in Tables 1 and 2. In this case, the guide roller was not provided with the step portion and the distortion and warpage of the electrode were not corrected at all in Comparative Example 1. In Examples having the heating temperature T expressed by "RT", curvature correction was made at room temperature (RT). In Example 13 having the heating temperature T expressed by 140° C., curvature correction was made with carrying out heating treatment at 140° C.

Comparative Example 2

The same procedures as in Example 1 were conducted except that the boundary between a current collector exposed portion 25a and an active material-containing layer 25b is positioned on a step portion 26 of a guide roller 24₃ doubling as a curvature compensator, and also, the current collector exposed portion 25a corresponding to the width of the short side thereof and the active material-containing layer 25b corresponding to the same width as the short side width of the current collector exposed portion 25a were arranged on the step portion 26. The results are shown in Tables 1 and 2.

Examples 19 to 21

The same procedures as in Example 1 were conducted except that a height H of the step portion formed in the guide roller, taper R, tensile stresses F of the strip positive and negative electrode plates, and heating temperature T of the electrode were set to those shown in Table 1. The results are shown in Tables 1 and 2.

TABLE 1

|  | Height H (%) | Step portion, taper R (mm) | Tensile stress F (N/mm²) | Heating temperature T (° C.) | Positive electrode, distortion Y₁ (mm) | Negative electrode, distortion Y₂ (mm) |
| --- | --- | --- | --- | --- | --- | --- |
| Example 1 | 300 | 6.5 | 40 | RT | 1.2 | 1.6 |
| Example 2 | 150 | 6.5 | 40 | RT | 1.7 | 2.0 |
| Example 3 | 450 | 6.5 | 40 | RT | 0.9 | 1.2 |
| Example 4 | 600 | 6.5 | 40 | RT | 0.8 | 1.0 |
| Example 5 | 300 | 0.5 | 40 | RT | 1.1 | 1.4 |
| Example 6 | 300 | 1.7 | 40 | RT | 1.1 | 1.4 |
| Example 7 | 300 | 9.0 | 40 | RT | 1.7 | 1.9 |
| Example 8 | 300 | 15 | 40 | RT | 1.8 | 2.0 |
| Example 9 | 300 | 6.5 | 20 | RT | 1.7 | 1.9 |
| Example 10 | 300 | 6.5 | 60 | RT | 1.0 | 1.2 |
| Example 11 | 300 | 6.5 | 80 | RT | 0.8 | 0.9 |
| Example 12 | 300 | 6.5 | 100 | RT | 0.6 | 0.7 |
| Example 13 | 300 | 6.5 | 40 | 140 | 0.9 | 1.4 |
| Example 14 | 100 | 6.5 | 40 | RT | 3.5 | 4.1 |
| Example 15 | 750 | 6.5 | 40 | RT | 0.8 | 0.9 |
| Example 16 | 300 | 30 | 40 | RT | 2.9 | 3.4 |
| Example 17 | 300 | 6.5 | 10 | RT | 3.3 | 3.9 |
| Example 18 | 300 | 6.5 | 120 | RT | 0.5 | 0.6 |
| Example 19 | 650 | 6.5 | 40 | RT | 0.8 | 1.0 |
| Example 20 | 700 | 6.5 | 40 | RT | 0.9 | 0.9 |
| Example 21 | 740 | 6.5 | 40 | RT | 0.8 | 0.9 |
| Comparative Example 1 | — | — | 20 | RT | 3.9 | 4.5 |
| Comparative Example 2 | 300 | 6.5 | 40 | RT | 2.7 | 2.9 |

TABLE 2

|  | Electrode breakage during winding | Weaving in an electrode group | Wrinkles and cracks of an electrode in an electrode group |
| --- | --- | --- | --- |
| Example 1 | — | — | — |
| Example 2 | — | — | — |
| Example 3 | — | — | — |
| Example 4 | — | — | — |
| Example 5 | — | — | Present |
| Example 6 | — | — | — |
| Example 7 | — | — | — |
| Example 8 | — | — | — |
| Example 9 | — | — | — |
| Example 10 | — | — | — |
| Example 11 | — | — | — |
| Example 12 | — | — | — |
| Example 13 | — | — | — |
| Example 14 | — | Present | — |
| Example 15 | — | — | Present |
| Example 16 | — | Present | — |
| Example 17 | — | Present | — |
| Example 18 | — | — | Present |
| Example 19 | — | — | — |
| Example 20 | — | — | — |
| Example 21 | — | — | — |
| Comparative Example 1 | — | Present | — |
| Comparative Example 2 | Present | Present | Present |

As is clear from Tables 1 and 2, it is found that Examples 1 to 18 are more reduced in both of the distortions of the positive and negative electrodes than Comparative Example 1. Also, in Example 1 to 18, there is no electrode breakage in the production of the electrode. In Comparative Example 2, on the other hand, the active material-containing layer was disposed on the step portion and therefore, the stress intended to be concentrated on only the current collector exposed portion was also dispersed to the active material-containing layer, so that the stress was concentrated more largely on the active material-containing layer having a higher thickness than the current collector exposed portion.

For this, in Comparative Example 2, electrode breakage was caused during winding or weaving was caused and also, wrinkles and cracks in the positive and negative electrodes were caused in the electrode group which did not reach the stage of electrode breakage but could be produced. From the comparison between Examples 1 to 4 and Examples 14 and 15, it is found that the distortion of the positive and negative electrodes of each of Examples 1 to 4 in which the height H is 150% to 600% is corrected more significantly than that in Example 14 in which the height H is less than 150%. In Example 15 in which the height H exceeded 600%, there was the case where wrinkles and cracks were generated when the positive and negative electrodes were wound to produce an electrode group though the distortion of the positive and negative electrodes was reduced. However, it was found from the results of Examples 19 to 21 that if the height H was designed to be less than 750% even in the case where the height H exceeded 600%, the distortion of the positive and negative electrodes was reduced and wrinkles and cracks were not generated at all when the positive and negative electrodes were wound.

It is found from the comparison between Examples 1 and 5 to 8 and Example 16 that the distortion of the positive and negative electrodes in Examples 1, and 5 to 8 in which the taper R is 15 mm or less is corrected more significantly than that in Example 16 in which the taper R exceeds 15 mm. Though the distortion was reduced with decrease in Taper R, there was the case where wrinkles and cracks were generated when the positive and negative electrodes were wound to produce an electrode group in Example 5 in which the taper R was 0.5 mm.

It is found from the comparison between Examples 1, 9 to 12, 17 and 18, that the distortion of the positive and negative electrodes in Examples 1, 9 to 12, and 18 in which the tensile stress F is 20 ($N/mm^2$) or more is corrected more remarkably than that in Example 17 in which the tensile stress F is less than 20 ($N/mm^2$). Though the distortion was reduced with increase in tensile force F, there was the case where wrinkles and cracks were generated when the positive and negative electrodes were wound to produce an electrode group in Example 18 in which the tensile force F exceeded 100.

It is found from the comparison between Examples 1 and 13, the distortion of the positive and negative electrodes in Example 13 in which the heating temperature is 60° C. to 150° C. is corrected more remarkably than that in Example 1 in which no heating treatment is carried out.

The height H (%) of the step portion formed in the guide roller preferably satisfies the following equation (A) when the thickness of the active material-containing layer on one surface of the strip current collector is 100%.

$$150 \leq H \leq 750 \quad (A)$$

When the height H is designed to be 150% to 750%, stress can be sufficiently concentrated on the current collector exposed portion to stretch it and therefore the warpage and distortion of the electrode can be reduced. Therefore, the breakage of the electrode can be prevented when the electrode is wound. Therefore, if the height H is designed to be 150% or more and less than 750%, distortion and warpage generated by compression molding can be reduced and also, wrinkles and cracks generated in the electrode when the electrode is wound can be limited.

According to at least one of the aforementioned embodiments and examples, the compression-molded strip electrode plate is arranged such that the current collector exposed portion is positioned at the step portion of the roller and the active material-containing layer is positioned at the recessed portion of the roller to apply tensile force in the direction of the long side of the strip electrode plate. Therefore, the tensile force can be concentrated on the current collector exposed portion, ensuring that the current collector exposed portion can be sufficiently stretched by plastic deformation. This enables the correction of the distortion and warpage generated in the electrode by the compression molding without remarkably increasing the tensile force to be applied to the strip electrode plate. Also, the breakage of the electrode when producing an electrode group can be prevented.

Example 22

An example of a positive electrode and negative electrode for a lithium ion secondary battery are shown below.
(First Step)
$LiCoO_2$ as a positive electrode active material, a graphite powder as a conductive agent, and a polyvinylidene fluoride (PVdF) as a binder were mixed and dispersed in an organic solvent to prepare a slurry. The obtained slurry was applied to a strip aluminum foil as a current collector except for both surfaces of one long side, followed by drying. In succession, the positive electrode plate was cut by a slit device in its longitudinal direction such that the ratio of the width of the coated portion (active material-containing layer) to the width of the uncoated portion (current collector exposed portion) was 9:1, to obtain a strip positive electrode plate.

$Li_4Ti_5O_{12}$ as a negative electrode active material, a carbon powder as a conductive agent, and a polyvinylidene fluoride (PVdF) as a binder were mixed and dispersed in an organic solvent to prepare a slurry. The obtained slurry was applied to a strip aluminum foil as a current collector except for both surfaces of one long side, followed by drying. In succession, the negative electrode plate was cut by a slit device in its longitudinal direction such that the ratio of the width of the coated portion (active material-containing layer) to the width of the uncoated portion (current collector exposed portion) was 9:1, to obtain a strip negative electrode plate.

Each active material-containing layer of the strip positive electrode plate and strip negative electrode plate was compressed by a press machine 21 shown in FIG. 8, and then, wound to make a reel by a first winder 23$_1$ after passing through a guide roller 22. In a guide roller 24$_3$ doubling as a curvature compensator, the boundary between a current collector exposed portion 25a and an active material-containing layer 25b was positioned at the boundary X between a step portion 26 and a recessed portion 27, the current collector exposed portion 25a was disposed on the step portion 26 and also, the active material-containing layer 25b was disposed on the recessed portion 27. A height H of the step portion 26 was 300% and a taper R was 6.5 mm. Also, tensile force (winding tension) was applied to each longitudinal direction of the strip positive electrode plate and strip negative electrode plate since the compression molding step using the press machine 21 until these electrodes were wound up to make reels by the first winder 23$_1$. A tensile force F at the section parallel to the direction of each short side of the strip positive electrode plate and strip negative electrode plate was 40 ($N/mm^2$). With regard to the strip positive electrode plate and strip negative electrode plate, heating treatment was not carried out in the curvature correction step, but curvature correction was performed in a room-temperature (RT) atmosphere.

Pieces having a length of 1 m were cut out of the reel of the positive electrode plate and the reel of the negative electrode plate respectively to measure each distortion. The distortion is, in the case of a positive electrode 6, a shortest distance $Y_1$ from a point on the line parallel to a length L (1 m) of the positive electrode 6 to the most curved point on the positive electrode 6 as shown in FIG. 7. In the case of a negative electrode 7, the distortion is the shortest distance $Y_2$ from a point on the line parallel to the length L (1 m) of the negative electrode 7 to the most curved point on the negative electrode 7.

(Second Step)

The reel-shaped positive and negative electrode plates after the first step were respectively dried. The drying was carried out at 150° C. for 10 hr in a vacuum atmosphere. After that, pieces having a length of 1 m were cut out of the positive and negative electrode plates respectively to measure each distortion in the same manner as that explained in the first step.

(Third Step)

The reel-shaped positive and negative electrode plates were respectively fed using a feeder 28 shown in FIG. 12 and conveyed to a guide roller $24_3$ via guide rollers $24_1$ and $24_2$. In the guide roller $24_3$, curvature correction was made in the same manner as that explained in the first step. After that, pieces having a length of 1 m were cut out of the positive and negative electrode plates respectively to measure each distortion in the same manner as that explained in the first step.

A separator was disposed between the positive and negative electrodes whose distortions were measured in the third step, a positive electrode current collector tab having a current collector exposed portion was made to project from the separator in the direction of the winding axis of the electrode group and also, a negative electrode current collector tab having a current collector exposed portion was made to project from the separator in the opposite direction, which was then wound in a flat state, to thereby produce an electrode group shown in FIG. 15. The frequency of electrode breakage was investigated during winding in the electrode group production process. Also, in the electrode group production process, the meanderings of the positive and negative electrodes were calibrated during winding by detecting the ends of the positive and negative electrodes by a sensor. The amount of correction at this time was defined as the amount of meandering.

Comparative Example 3

Positive and negative electrodes and an electrode group were produced in the same manner as in Example 22 except that no step portion was formed in the guide roller and the distortion and warpage of the electrode were not corrected at all, to measure the amount of distortion, amount of meandering, and frequency of electrode breakage.

Comparative Example 4

Positive and negative electrodes and an electrode group were produced in the same manner as in Example 22 except that the curvature correction performed in the first and third steps was altered as follows, to measure the amount of distortion, amount of meandering, and frequency of electrode breakage.

The boundary between a current collector exposed portion 25a and an active material-containing layer 25b was positioned on a step portion 26 of a guide roller $24_3$ doubling as a curvature compensator. Also, the current collector exposed portion 25a corresponding to all the width of the short side thereof and the active material-containing layer 25b corresponding to the same width as the short side width of the current collector exposed portion 25a were arranged on the step portion 26. A height H of the step portion 26, taper R, and tensile force F were measured in the same condition as that in Example 22. Also, curvature correction was performed in the same room-temperature (RT) atmosphere as in the case of Example 22.

The following Table 3 shows the results of the amount of distortion and amount of meandering in Example 22 and Comparative Example 4 when the measured values of Comparative Example 3 were respectively defined as 100%, and the frequency of electrode breakage of the electrode plate in each of Example 22 and Comparative Examples 3 and 4.

TABLE 3

|  | Amount of distortion of an electrode plate (%) | Amount of meandering of an electrode plate (%) | Electrode plate breakage (X: frequent, Δ: sometimes, ○: none) |
|---|---|---|---|
| Example 22 |  |  |  |
| First step | 10 | — | — |
| Second step | 60 | — | — |
| Third step | 10 | 5 | ○ |
| Example 25 |  |  |  |
| First step | 7 | — | — |
| Second step | 35 | — | — |
| Third step | 8 | 3 | ○ |
| Example 26 |  |  |  |
| First step | 7 | — | — |
| Second step | 30 | — | — |
| Third step | 7 | 2 | ○ |
| No curvature correction step (Comparative Example 3) | 100 | 100 | Δ |
| Comparative Example 4 |  |  |  |
| First step | 80 | — | — |
| Second step | 90 | — | — |
| Third step | 80 | 70 | Δ |

As is clear from Table 3, it is found that Example 22 is more reduced in the amount of distortion and amount of meandering after the third step of the positive and negative electrodes than Comparative Example 3. Also, when comparing Example 22 with Comparative Example 4, it is found that Example 22 is more reduced in the distortion of each of the positive and negative electrodes in any of the first to third steps than Comparative Example 4 and is also more reduced than Comparative Example 4 in the amount of meandering when the electrode group is produced. Also, the frequency of the breakage of the positive and negative electrodes when a winding-type electrode group was produced was 0 in Example 1 whereas the breakage of the electrode sometimes occurred in Comparative Examples 3 and 4.

Example 23

The positive and negative electrode and the electrode group were produced in the same manner as in Example 22 except that the drying condition in the second step was altered to the following condition: 150° C., air atmosphere, and 10 hr, to measure the amount of distortion, amount of meandering, and frequency of electrode breakage.

Comparative Example 5

Positive and negative electrodes and an electrode group were produced in the same manner as in Example 23 except that no step portion was formed in the guide roller and the distortion and warpage of the electrode were not corrected at all, to measure the amount of distortion, amount of meandering, and frequency of electrode breakage.

Comparative Example 6

Positive and negative electrodes and an electrode group were produced in the same manner as in Example 23 except that the curvature correction performed in the first and third steps was carried out in the same manner as in Comparative Example 4, to measure the amount of distortion, amount of meandering, and frequency of electrode breakage.

The following Table 4 shows the results of the amount of distortion and amount of meandering in Example 23 and Comparative Example 6 when the measured values of Comparative Example 5 are respectively defined as 100%, and the frequency of electrode breakage in each of Example 23 and Comparative Examples 5 and 6.

TABLE 4

|  | Amount of distortion of an electrode plate (%) | Amount of meandering of an electrode plate (%) | Electrode plate breakage (X: frequent, Δ: sometimes, ○: none) |
|---|---|---|---|
| Example 23 |  |  |  |
| First step | 15 | — | — |
| Second step | 65 | — | — |
| Third step | 10 | 5 | ○ |
| No curvature correction step (Comparative Example 5) | 100 | 100 | Δ |
| Comparative Example 6 |  |  |  |
| First step | 85 | — | — |
| Second step | 90 | — | — |
| Third step | 85 | 85 | Δ |

As is clear from Table 4, it is found that Example 23 is more reduced in the amount of distortion and amount of meandering after the third step of each of the positive and negative electrodes than Comparative Example 5. Also, when comparing. Example 23 with Comparative Example 6, it is found that Example 23 is more reduced in the distortion of each of the positive and negative electrodes in any of the first to third steps than Comparative Example 6 and is also more reduced than Comparative Example 6 in the amount of meandering when the electrode group is produced. Also, the frequency of the breakage of the positive and negative electrodes when a winding-type electrode group was produced was 0 in Example 23 whereas the breakage of the electrode sometimes occurred in Comparative Examples 5 and 6.

Example 24

(First Step)

With regard to each of the strip positive electrode plate and strip negative electrode plate produced in the same manner as that explained in the first step of Example 22, the active material-containing layer was compressed until its thickness was reduced to 90% of the thickness before compressed (the thickness after coating and drying was defined as 100%) by a first press machine $21_1$ shown in FIG. 12, and then, conveyed to guide rollers $24_1$ to $24_4$. In the guide roller $24_3$, curvature correction was performed in the same manner as that explained in Example 22. Thereafter, the amount of distortion was measured in the same manner as in Example 22.

(Second Step)

After the amount of distortion was measured in the first step, the active material-containing layer was compressed until its thickness was reduced to 80% of the thickness (the thickness after coating and drying was defined as 100%) by a second press machine $21_2$. The curvature correction of a strip electrode plate 25 which had passed through the second press machine $21_2$ was performed in the same manner as that explained in Example 22. After that, the amount of distortion was measured in the same manner as in Example 22.

(Third Step)

After the amount of distortion was measured in the second step, the active material-containing layer was compressed until its thickness was reduced to 75% of the thickness (the thickness after coating and drying was defined as 100%) by a third press machine having the same structure as the first and second press machines. The curvature correction of the strip electrode plate which had passed through the third press machine was performed in the same manner as that explained in Example 22. After that, the amount of distortion was measured in the same manner as in Example 22.

A separator was disposed between the positive and negative electrodes whose distortions were measured in the third step, a positive electrode current collector tab having a current collector exposed portion was made to project from the separator in the direction of the winding axis of the electrode group and also, a negative electrode current collector tab having a current collector exposed portion was made to project from the separator in the opposite direction, which was then wound in a flat state, to thereby produce an electrode group shown in FIG. 15. The frequency of electrode breakage and the meanderings of the electrode plates during winding in the electrode group production process were investigated.

Comparative Example 7

Positive and negative electrodes and an electrode group were produced in the same manner as in Example 24 except that no step portion was formed in the guide roller and the distortion and warpage of the electrode were not corrected at all, to measure the amount of distortion, amount of meandering, and frequency of electrode breakage.

Comparative Example 8

Positive and negative electrodes and an electrode group were produced in the same manner as in Example 24 except that the curvature correction performed in the first to third steps was performed in the same manner as in Comparative Example 4, to measure the amount of distortion, amount of meandering, and frequency of electrode breakage.

The following Table 5 shows the results of the amount of distortion and amount of meandering in Example 24 and Comparative Example 8 when the measured values of Comparative Example 7 are respectively defined as 100%, and the frequency of electrode breakage in each of Example 24 and Comparative Examples 7 and 8.

TABLE 5

| | Amount of distortion of an electrode plate (%) | Amount of meandering of an electrode plate (%) | Electrode plate breakage (X: frequent, Δ: sometimes, ○: none) |
|---|---|---|---|
| Example 24 | | | |
| First step | 7 | — | — |
| Second step | 7 | — | — |
| Third step | 5 | 5 | ○ |
| No curvature correction step (Comparative Example 7) | 100 | 100 | Δ |
| Comparative Example 8 | | | |
| First step | 90 | — | — |
| Second step | 90 | — | — |
| Third step | 85 | 90 | Δ |

As is clear from Table 5, it is found that Example 24 is more reduced in the amount of distortion and amount of meandering of the positive and negative electrodes after the third step than Comparative Example 7. Also, when comparing Example 24 with Comparative Example 8, it is found that Example 24 is more reduced in the distortion of each of the positive and negative electrodes in any of the first to third steps than Comparative Example 8 and is also more reduced than Comparative Example 8 in the amount of meandering when the electrode group is produced. Also, the frequency of the breakage of the positive and negative electrodes when a winding-type electrode group was produced was 0 in Example 24 whereas the breakage of the electrode sometimes occurred in Comparative Examples 7 and 8.

Example 25

Positive and negative electrodes and an electrode group were produced in the same manner as in Example 22 except that a height H of a step portion 26 was altered to 600%, to measure the amount of distortion, amount of meandering, and frequency of electrode breakage. The results are shown together in Table 3.

Example 26

Positive and negative electrodes and an electrode group were produced in the same manner as in Example 22 except that the height H of the step portion 26 was altered to 740%, to measure the amount of distortion, amount of meandering, and frequency of electrode breakage. The results are shown together in Table 3.

As is clear from Table 3, it is found that Examples 25 and 26 are respectively reduced in the amount of distortion and amount of meandering of each of the positive and negative electrodes after the third step than Comparative Example 3. It is also found that when comparing Examples 25 and 26 with Comparative Example 4, the amount of distortion of each of the positive and negative electrodes is smaller than that in Comparative Example 4 in any of the first to third steps, and also, the amount of meandering in the production of the electrode group is smaller than that in Comparative Example 4. The frequency of the breakage of positive and negative electrodes in Examples 25 and 26 was 0 when the winding-type electrode group was produced.

A height H (%) of the step portion formed in the guide roller preferably satisfies the following equation (A) when the thickness of the active material-containing layer on one surface of the strip current collector is 100%.

$$150 \leq H \leq 750 \quad (A)$$

When the height H is designed to be 150% to 750%, stress can be sufficiently concentrated on the current collector exposed portion to stretch it and therefore the warpage and distortion of the electrode can be reduced. Therefore, the breakage of the electrode when the electrode is wound can be prevented. Also, if the height H is designed to be 150% or more and less than 750%, distortion and warpage generated in the electrode by compression molding can be reduced and also, the breakage of the electrode when the electrode is wound can be limited.

Although examples and embodiments have been explained above, the present invention is not limited to the above examples and embodiments. For example, the height and shape of the step portion formed in the guide roller and tensile stress are properly changed corresponding to the thickness and weight of the active material-containing paste to be applied, the ratio of the coated portion to the uncoated portion, the compressive density of the electrode plate, or the influence of the second step, thereby ensuring that the same effect can be obtained. Moreover, the same effect can be obtained whether the coating of the active material paste is continuous or intermittent. Also, the material of the current collector of the electrode is not limited to an aluminum foil, but the height and shape of the step portion, tensile stress and the like are properly changed according to the material, thickness, tensile force and hardness of the current collector, thereby also obtaining the same effect.

According to at least one of the aforementioned embodiments and examples, the current collector exposed portion is positioned at the step portion of the roller and the active material-containing layer is positioned at the recessed portion of the roller to apply tensile force in the direction of the long side of the strip current collector to thereby correct distortion and warpage of the electrode. Therefore, the tensile force can be concentrated on the current collector exposed portion, ensuring that the current collector exposed portion can be sufficiently stretched by plastic deformation. As a result, the distortion and warpage generated in the electrode in the compression molding can be corrected without remarkably increasing the tensile force to be applied to the strip electrode plate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for producing an electrode, comprising:
    compression-molding an active material-containing layer of a strip electrode plate, and the strip electrode plate comprising a strip current collector, a current collector exposed portion which is formed on at least one long side of the strip current collector and in which no active material-containing layer exists on each surface thereof, and the active material-containing layer formed on at least a part of the strip current collector excluding the current collector exposed portion;

arranging the strip electrode plate on a roller comprising a step portion projected from a circumferential surface and a recessed portion adjacent to the step portion such that the current collector exposed portion is positioned on the step portion and the active material-containing layer is positioned on the recessed portion applying a first winding tensile force to the strip electrode plate in a longitudinal direction of the strip electrode plate to stretch the current collector exposed portion;

winding the strip electrode plate, to which the first winding tensile force is applied, by a winder to obtain a reel of the strip electrode plate;

applying a drying treatment to the reel of the strip electrode plate;

arranging the strip electrode plate, to which the drying treatment is applied, on the roller such that the current collector exposed portion is positioned on the step portion and the active material-containing layer is positioned on the recessed portion; and applying a second winding tensile force to the strip electrode plate, to which the drying treatment is applied, in the longitudinal direction of the strip electrode plate to stretch the current collector exposed portion.

2. The method for producing an electrode according to claim 1,
wherein a height of the step portion satisfies the following equation (A):

$$150 \leq H \leq 750 \quad (A)$$

wherein H is the height (%) of the step portion when the thickness of the active material-containing layer on one side of the strip current collector is 100%.

3. The method for producing an electrode according to claim 1,
wherein a height of the step portion satisfies the following equation (1):

$$150 \leq H \leq 600 \quad (1)$$

wherein H is the height (%) of the step portion when the thickness of the active material-containing layer on one side of the strip current collector is 100%.

4. The method for producing an electrode according to claim 1,
wherein the step portion has a taper R (mm) falling in the following range: $0.5 \leq R \leq 7$.

5. The method for producing an electrode according to claim 1,
wherein a tensile stress F (N/mm$^2$) applied to the strip electrode plate in the applying the first and/or the second winding tensile force satisfies the equation $20 \leq F \leq 100$.

6. The method for producing an electrode according to claim 5,
wherein the strip electrode plate is subjected to heating treatment performed at 60° C. to 150° C. in the applying the first and/or the second winding tensile force.

7. The method for producing an electrode according to claim 1,
wherein the active material-containing layer is formed continuously or intermittently in the longitudinal direction of the strip current collector, on the at least the part of the strip current collector excluding the current collector exposed portion.

8. The method for producing an electrode according to claim 1,
wherein the strip current collector is made of an aluminum foil, an aluminum alloy foil, or a copper foil.

9. A method for producing a battery comprising a positive electrode, a negative electrode, and a nonaqueous electrolyte,
wherein at least one of the positive and negative electrodes is produced by the method as claimed in claim 1.

10. The method for producing an electrode according to claim 1,
wherein the step portion has a taper R (mm) falling in the following range: $R \leq 15$.

* * * * *